United States Patent
Ruiter et al.

(10) Patent No.: US 7,626,966 B1
(45) Date of Patent: Dec. 1, 2009

(54) AD HOC WIRELESS COMMUNICATION SYSTEM

(75) Inventors: Karl A. Ruiter, South Pasadena, CA (US); Joseph Olivier, South Pasadena, CA (US); Clark Crawford, Los Angeles, CA (US)

(73) Assignee: Idealab, Pasadena, CA (US)

( * ) Notice: Subject to any disclaimer, the term of this patent is extended or adjusted under 35 U.S.C. 154(b) by 758 days.

(21) Appl. No.: 11/327,192

(22) Filed: Jan. 6, 2006

Related U.S. Application Data

(60) Provisional application No. 60/642,342, filed on Jan. 6, 2005.

(51) Int. Cl.
*G06F 9/445* (2006.01)
(52) U.S. Cl. .................................. 370/337; 370/310
(58) Field of Classification Search .................. 370/337, 370/310, 338, 521, 532, 282; 455/509, 513
See application file for complete search history.

(56) References Cited

U.S. PATENT DOCUMENTS

| | | | |
|---|---|---|---|
| 5,987,011 A | 11/1999 | Toh | |
| 6,044,062 A | 3/2000 | Brownrigg | |
| 6,157,620 A | 12/2000 | Danne | |
| 6,249,516 B1 | 6/2001 | Brownrigg | |
| 6,349,091 B1 | 2/2002 | Li | |
| 6,718,394 B2 | 4/2004 | Cain | |
| 6,754,468 B1 | 6/2004 | Sieben | |
| 2002/0058502 A1 | 5/2002 | Stanforth | |
| 2002/0058504 A1 | 5/2002 | Stanforth | |
| 2003/0040316 A1 | 2/2003 | Stanforth | |
| 2003/0045295 A1 | 3/2003 | Stanforth | |

*Primary Examiner*—Sam Bhattacharya
(74) *Attorney, Agent, or Firm*—Andrew S. Naglestad; Law Office of Michael Blaine Brook

(57) ABSTRACT

A communication device for use in an ad hoc network is disclosed. The device is adapted to concurrently (a) communicate directly with other network nodes, (b) communicate indirectly with other network nodes via intermediate network nodes, and (c) serve as an intermediate network node with respect to other network nodes indirectly communicating with one another. When implementing unicast communications, the communication device employs a CSMA protocol with which to identify and reserve available communication slots defined in accordance with a TDMA protocol without the use of a beacon signal. When implementing multicast communications, the communication device employs a stochastic re-transmission scheme that ensures widespread dissemination of messages with minimal flooding.

16 Claims, 19 Drawing Sheets

Main Screen/Default

Call List Screen (Group)

Group List Screen

Group Members Screen

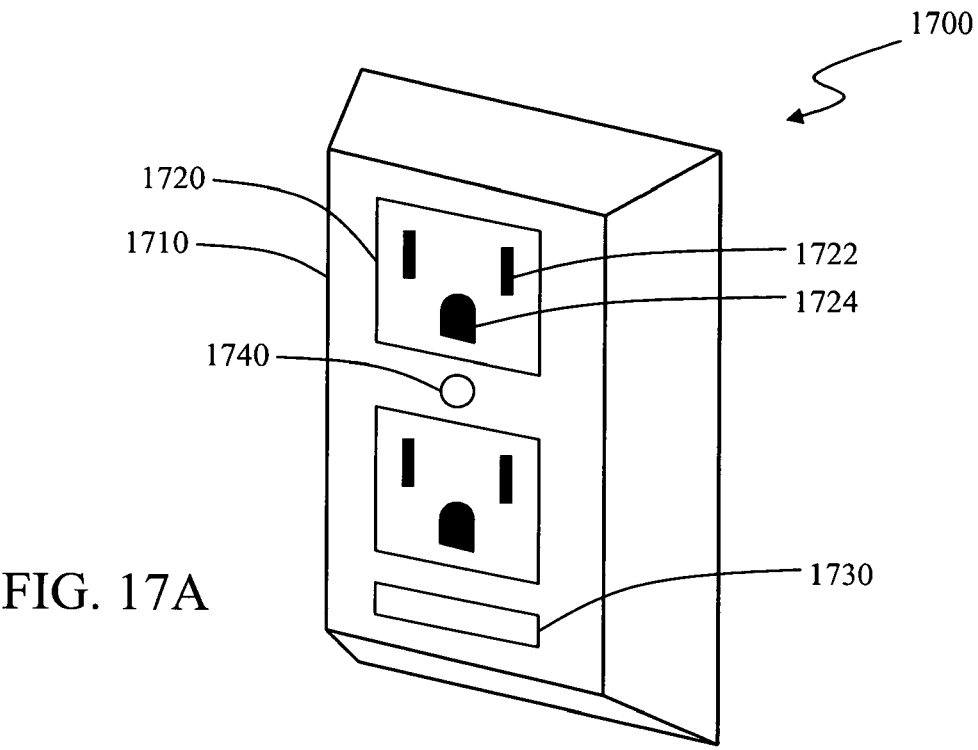
FIG. 17A
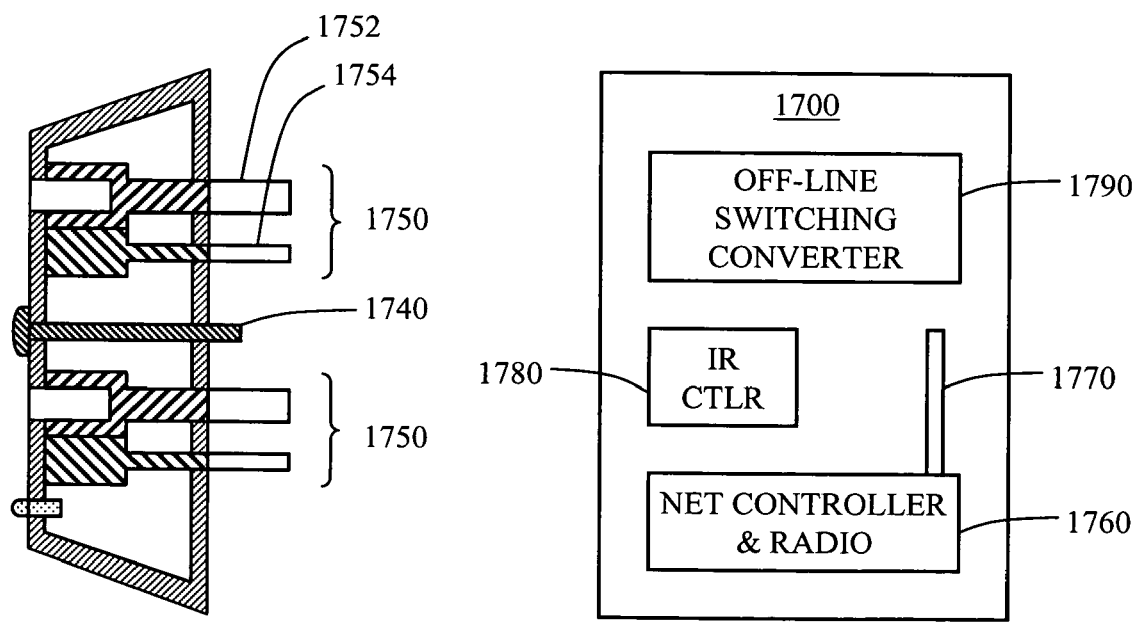
FIG. 17B
FIG. 17C

AD HOC WIRELESS COMMUNICATION SYSTEM

CROSS-REFERENCE TO RELATED APPLICATION

This application claims the benefit of U.S. Provisional Patent Application Ser. No. 60/642,342 filed Jan. 6, 2005, entitled "AD HOC WIRELESS COMMUNICATION SYSTEM," which is hereby incorporated by reference herein for all purposes.

FIELD OF INVENTION

The invention generally relates to a mobile communication system for performing ad hoc data communications. In particular, the preferred embodiment relates to a system and method for establishing and dynamically maintaining unicast or multicast voice communications in a network based on one or more protocols cooperatively administered by the mobile nodes.

BACKGROUND

There are in the prior art various wireless communications devices for establishing an ad hoc communications network providing on-site communication for companies or organizations that have mobile users in need of instant communications for purposes of sharing information, coordination activities, and supervision or management of employees. The distance over which they need to communicate is generally limited to a site, facility, campus, building, premises or other local geographical area.

The geographic extent of these prior art communications systems are however limited by the transmit power and effective range of the individual user devices themselves. In the unlicensed 902-928 MHz bands used for industrial, scientific, and medial (ISM) applications, for example, devices with a transmit power of 100 milliwatts may have a maximum transmit range of 500 feet, and less where natural and man-made obstructions attenuate and or reflect transmissions. Users located more than 500 feet away are generally unable to communicate and must rely on one or more dedicated repeaters or other type of network infrastructure to extend the effective range of the network. Such infrastructure is, however, expensive to install and maintain, results in fixed black-out zones depending on local terrain and structures, and virtually useless when a user device and repeater are out of range of one another.

There is therefore a need for a flexible communication system that enables users to place and receive calls between users who may be out of transmit range of one another without the need for repeaters or other infrastructure being located every location the users may be located or location to which the users may migrate. The system should also be able to deploy and administer itself with little or no external control or guidance while being flexible enough to cope with changing network conditions—connecting mobile nodes new to the network, disconnecting mobile nodes that depart from the network, and routing around occasion link failures between individual pairs of nodes—while still maintaining communications between the various nodes.

SUMMARY

The problems encountered in the prior art are addressed by the preferred embodiment of the present invention which features wireless communication handsets adapted to form a stand alone network employing multi-hop mesh networking to cooperatively establish and maintain connections between any two or more handsets within the network. This self-deploying and self-administering communication system can (a) provide on-site communications for companies or organizations that have mobile employees or members distributed over a limited geographic such as a corporate site, facility, campus, building, or premises, for example; (b) increase the geographic range of communications with multi-hop capability while improving the reliability of reception, particularly between nodes without an unobstructed line-of-site there between; (c) offer low-cost voice communications capability to those countries and regions with minimal telecommunications infrastructure.

In some embodiments, one or more of the mobile nodes or stationary nodes is adapted to exchange data with an access point or gateway interconnecting the mesh network to another communication network such as the Public Switched Telephone Network (PSTN) or the Internet (IP). Such interconnection drastically increases the reach of such mesh network communication solutions enabling long distance communication beyond the reach of the mesh network itself, and relaxes the constraint of a continuous set of mesh network devices being necessary to hop through in order to go large distances within the mesh network itself. The interconnection also enhances the capacity of the mesh network itself and drastically increases the scalability of such multi-hop mesh networks.

BRIEF DESCRIPTION OF THE DRAWINGS

FIG. 17A is a perspective view of a non-mobile node.

FIG. 17B is a cross sectional view of a non-mobile node.

FIG. 17C is a functional block diagram of a non-mobile node.

DETAILED DESCRIPTION OF THE PREFERRED EMBODIMENT

Figure 1:
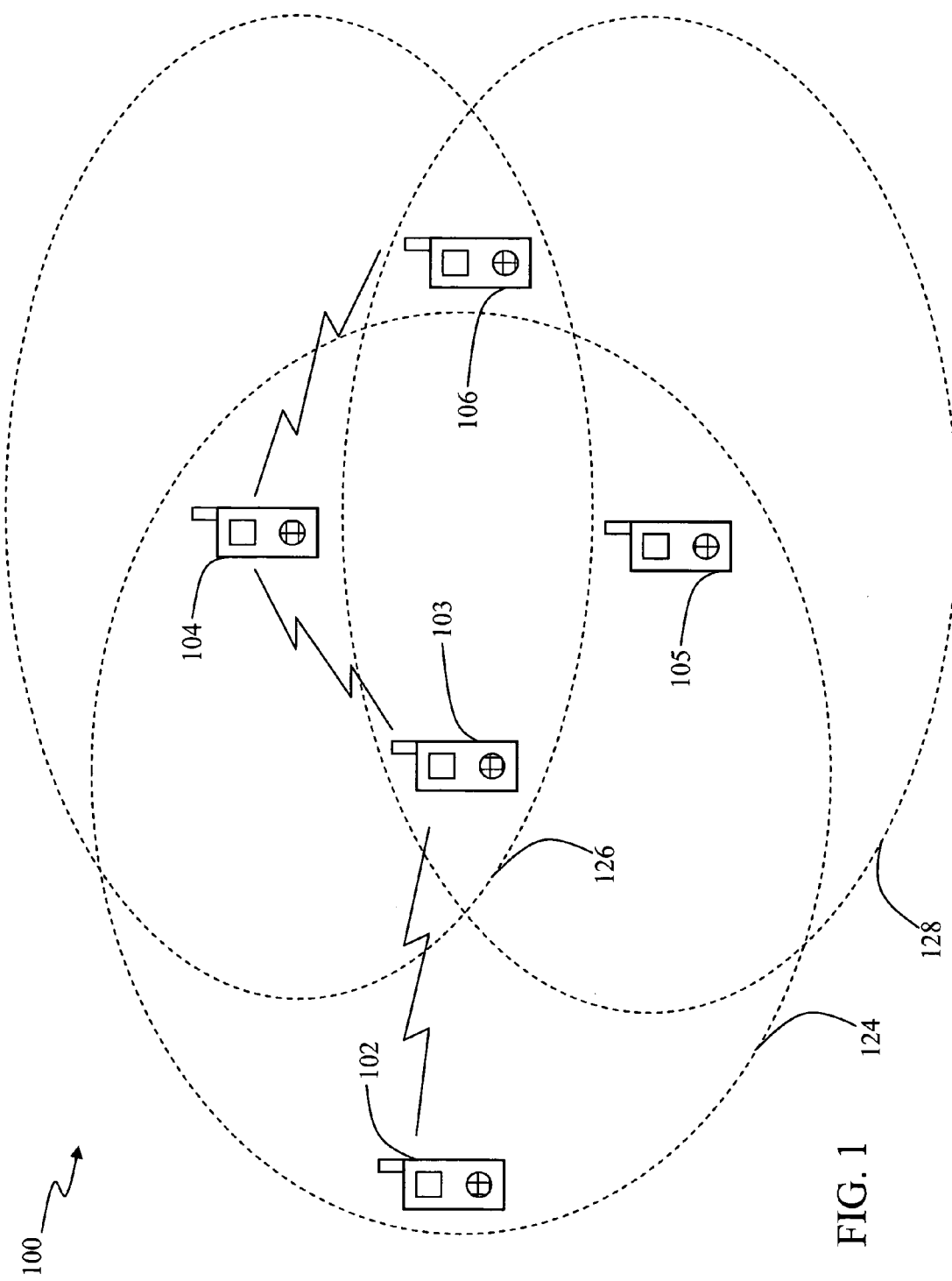
FIG. 1 is a functional block diagram of a network comprising one or more mobile communication devices with relay capability (MCDR).

Illustrated in FIG. 1 is a network comprising one or more mobile communication devices with relay capability (MCDR). Each of the MCDRs 102-106 is a portable, preferably phone handset adapted to engage in peer-to-peer communications with one or more other MCDRs forming an ad hoc network. The handset may include an interface adapted to be operated in the hand of the user and or a headset with audio input and output. The MCDRs 102-106 preferably exchange digital data units including voice communications, although various forms of audio, video, and data may also be exchanged. Each of the MCDRs 102-106 is also adapted to participate in a call as an end node with respect to the flow of voice data units or as an intermediate node relaying one or more flows between other devices, or both at the same time. When operating as an end node, the user can, for example, place or answer a call to another node. When operating as a relay, each of the MCDRs 102-106 is adapted to receive and forward voice data units, for example, on behalf of two or more other nodes in communication. A first MCDR 102, for example, may communicate with a fourth MCDR 106 via a second MCDR 103 and third MCDR 104 that forward the voice data units with minimal latency. The ad hoc network 100 may further include or be operatively coupled to one or more signal-switch networks including the public switch telephone network (PSTN), one or more packet-switched networks including local area networks (LANs), wide area networks (WANs), metropolitan area networks (MANs), or the Internet, or a combination thereof, for example.

Each of the MCDRs 102-106 is adapted to transmit messages using a wireless communications media such as radio frequency (RF), visible light, or infrared, for example. Although each of MCDRs 102-106 is adapted to communicate directly with a plurality of MCDRs, the MCDRs are also adapted to establish communications indirectly through other MCDRs, thereby extending the effective range beyond a single direct link. The single link range over which two MCDRs may communicate is generally limited by various factors including transmit power, geographic terrain, and buildings and like obstructions, for example. The single link range over which MCDR 103 may transmit is schematically represented by a first ellipse 124, the range of the MCDR 104 schematically represented by a second ellipse 126, and the range of the MCDR 105 schematically represented by a third ellipse 128. Since each MCDR 102-106 may server as a relay, however, the distance between two MCDRs in communication may be significantly larger than the maximum single link distance between two MCDRs in direct communication.

Figure 2:
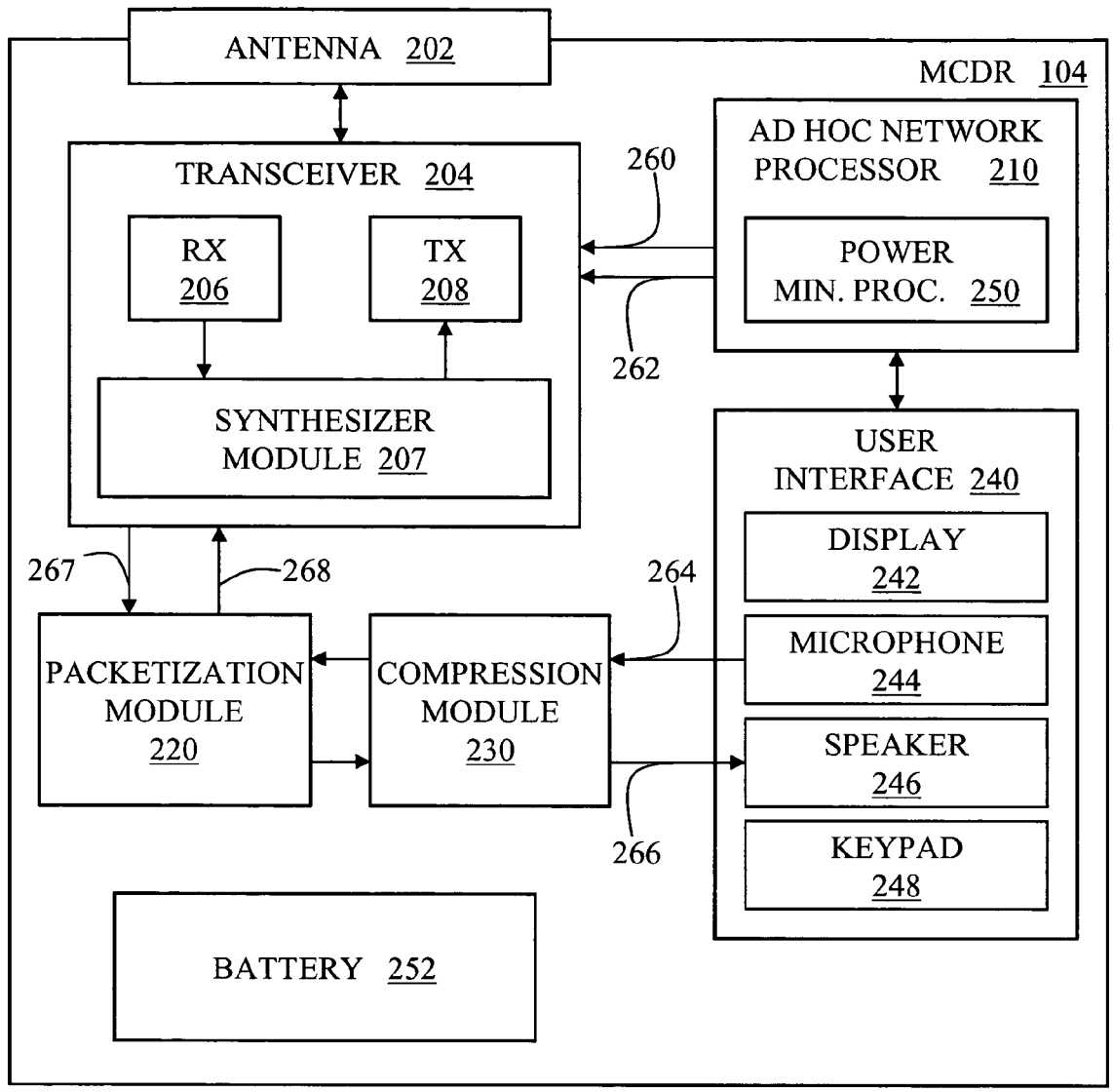
FIG. 2 is a functional block diagram of a MCDR.

Illustrated in FIG. 2 is a functional block diagram of the MCDR 104, which is representative of each of the plurality of MCDRs 102-103, 105-106. The MCDR 104 includes a wireless interface, a user interface 240, an ad hoc network processor 210, and a power minimization processor 250 including a battery 252. The wireless interface in the preferred embodiment includes a radio frequency (RF) antenna 202, transceiver 204, packetization module 220, and compression module 230. The transceiver module 204 is adapted to operate at one or more channels within the 902-928 MHz band, although various other RF, visible light, or infrared bands may be supported. The transceiver module 204 includes a receiver 206 and transmitter 208 adapted to receive and transmit, respectively, at a particular channel 260 determined by the ad hoc network processor 210 in accordance with criteria discussed in more detail below. In the preferred embodiment, the receiver 206 also supports a plurality of receiver modes having different selectivity and or sensitivity settings, each of which is associated with a different power level 262 specified by the ad hoc network processor 210. The plurality of receiver modes includes (1) a low power mode operating at 50 milliamperes at −85 dbm with a 10e-4 bit error rate (BER) and (2) a high sensitivity mode operating at 57 milliamperes at −95 dbm with a 10e-4 BER. In some embodiments, the plurality of receiver modes further include (3) an interference-suppression mode. The transceiver module 204 further includes a carrier frequency synthesizer 207 for demodulating received signals and modulating transmitted signals.

With respect to a received signal, the synthesizer 207 demodulates the high frequency signals acquired by the receiver 206 to extract packetized voice data, the packetization module 220 removes packet header information and outputs units of voice data 267, the compression module 230 decompressed the voice data, and the user interface 240 reproduces the received voice signals 266 with a speaker 246. The user interface 240 further includes a graphical user interface such as a liquid crystal display 242, a microphone 244, a speaker 246 or like audio output, and an alphanumeric keypad 248. One skilled in the art will appreciate that the transceiver 204, packetization module 220, and compression module 230 may be implemented using various forms of hardware, software, and firmware including one or more discrete components or integrated circuits in either the analog domain, digital domain, or both.

The power minimization processor 250 of the ad hoc network processor 210 is adapted to control the supply of power to the transceiver module 204 in accordance with the ad hoc network processor 210, which monitors and adjusts the receiver power in accordance with the quality of reception on one or more channels. The ad hoc network processor 210 selects the minimum power mode required to achieve a predetermined signal quality or integrity for purposes of maximizing the duration of the available charge on the battery 252. When the signal to noise ratio drops and the BER increases beyond one or more predetermined reception thresholds, for example, the power minimization processor 250 provides increased receiver power to enhance the selectivity and or the sensitivity of the receiver 206. Receiver power levels are also reduced to conserve power when increased receiver power is unnecessary to achieve the requisite receiver signal quality.

With respect to data transmission from MCDR 104, voice signals 264 acquired at the microphone 244 are subjected to data compression by compression module 230, encapsulated by the packetization module 220, and used to modulate a carrier frequency at the synthesizer module 207 before being transmitted by the transmitter 208. The transmitter 208 in the preferred embodiment is adapted to transmit using one or more transmitter modes including a maximal range mode operating at 300 milliwatts, an intermediate range mode operating at 100 milliwatts, a high node density mode operating at 10 milliwatts, and a maximal node density mode operating at 1 milliwatt. The compression module 230 employed in the preferred embodiment is a Texas Instruments TMS320C54 series processor for performing G.729AB voice compression at 8 kbps with silence compression, the voice compression algorithm being available from Gao Research of Ontario, Canada.

Figure 3:
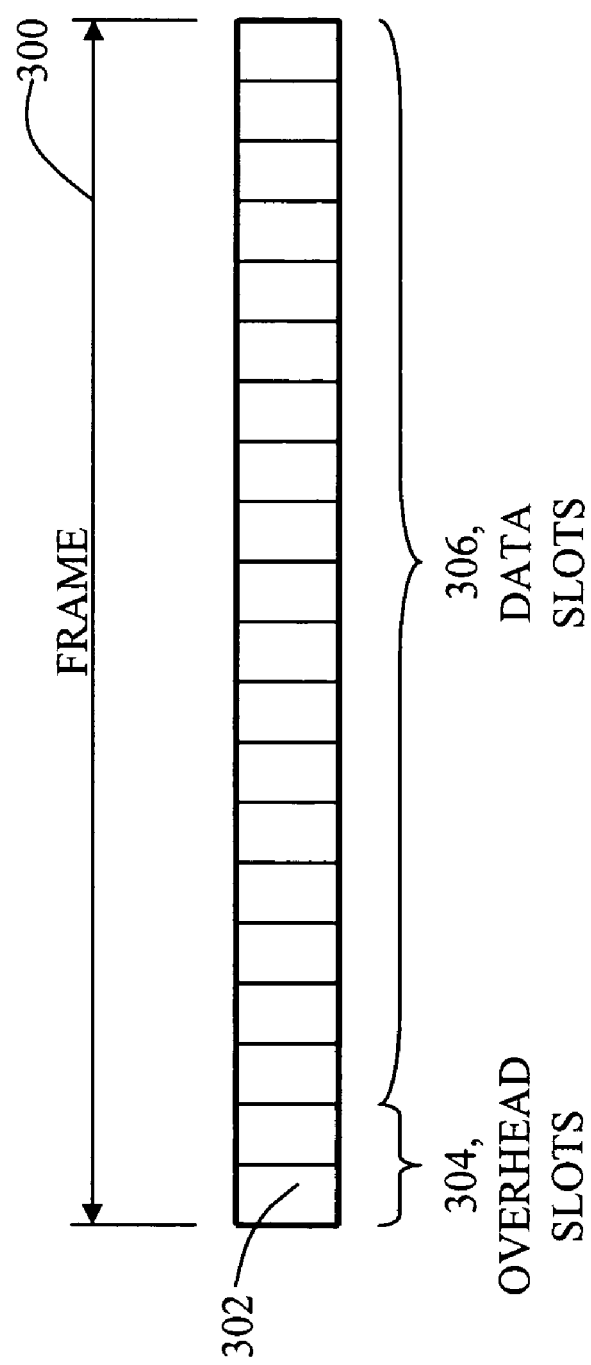
FIG. 3 illustrates a frame with a plurality of slots.

In the preferred embodiment, the ad hoc network processor (AHNP) 210 is adapted to implement a time division multiple access (TDMA) communications protocol and provide link management and call management. The TDMA employed in the preferred embodiment is a slotted TDMA employing a local reservation procedure. The TDMA scheme employed herein includes a plurality of slots, each slot representing a time period or window during which a MCDR may transmit data or receive data at a given channel within a given frequency band. Referring to FIG. 3, the plurality of slots 302 are organized into a frame 300 providing a temporal pattern that is periodically repeated while at least one MCDR is active in the ad hoc network. In the preferred embodiment, the frame 300 includes 20 slots 302, each of which is one millisecond in duration. The first two slots 304 of each frame, referred to herein as overhead slots, are reserved for overhead traffic for cooperatively coordinating the transmission of data between nodes. Overhead traffic includes various messages such as call route discovery messages, call setup messages, and network sync messages, which are discussed in more detail below. The remaining 18 slots 306 of each frame 300, referred to herein as data slots, are reserved for data transmission including the exchange of voice data units. One skilled in the art will appreciate that the number and duration of the slots may be varied. In some embodiments, the number of slots may be reduced or increased to as many as approximately 40 slots and the slot duration made as small as approximately 500 microseconds.

Figure 4:
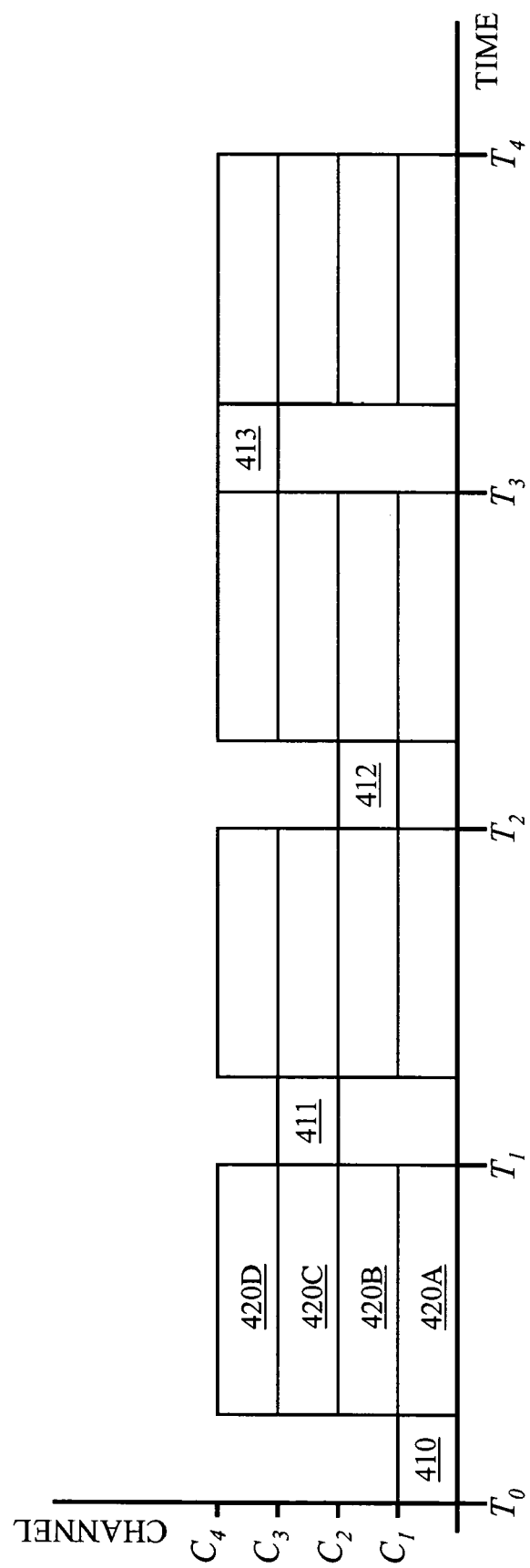
FIG. 4 illustrates the frequency band over which a plurality of MCDRs operate.

The MCDR 104 employs separate protocols to send and receive information via the overhead slots 304 and data slots 306. As illustrated in FIG. 4, the frequency band over which the plurality of MCDRs 102-106 transmit and receive includes a plurality of frequency channels $C_1$-$C_4$. Each of these channels $C_1$-$C_4$ may be used to transmit overhead messages as well as data messages depending on the slot position. Overhead messages are sent at the initial slots of each of the plurality of successive frames coinciding with times $T_0$-$T_4$ while the data messages sent thereafter. In the preferred embodiment, messages transmitted during overhead slots are transmitted at a select channel of a plurality of channels $C_1$-$C_4$, and the select channel varied between successive frames. The overhead slots associated with the plurality of successive frames correspond to the plurality of slots schematically represented by blocks 410-413. Voice data, in contrast, may be sent during data slots at each of the plurality of channels for each successive frame. The plurality of data slots associated with the plurality of channels $C_1$-$C_4$ and a first frame transmitted at time interval $T_0$ correspond to the plurality of slots schematically represented by blocks 420A-420D.

Each of the MCDRs 102-106 is adapted to tune its receiver 206 to overhead channel at the onset of each frame, the particular overhead slot being different between successive frames. In accordance with the preferred embodiment, the particular overhead channel varies from frame to frame in a predetermined pattern referred to herein as the overhead hopping sequence. The overhead hopping sequence causes the overhead channel to hop through each of the plurality of four channels $C_1$-$C_4$, although one skilled in the art will appreciate that the number of channels may vary depending on the implementation. At the end of overhead slots, each MCDR 102-106 generally tunes its receiver 206 to a "home channel" at which it receives data from other neighboring nodes.

In accordance with the preferred embodiment, the MCDR 104 as well as every other MCDR in the ad hoc network monitors the plurality of channels $C_1$-$C_4$ from which it first selects a home channel from among the plurality of channels $C_1$-$C_4$. A home channel as used herein refers to the one of the plurality of channels $C_1$-$C_4$ on which the MCDR 104 has the highest quality reception. The MCDR 104 then advertises its home channel to other MCDRs and learns the home channel associated with the other neighboring MCDRs. Thereafter, the MCDR 104 transmits voice data units on the home channel associated with the MCDR to which it is transmitting and listens for voice data units from other MCDRs on its own home channel. The home channel of the two or more of the plurality of MCDRs 102-106 may be the same although they are generally different due to environmental factors, for example, that affect reception quality. The reception quality may be monitored over time and the home channel selected by the MCDR 104 changed as needed.

Figure 5:
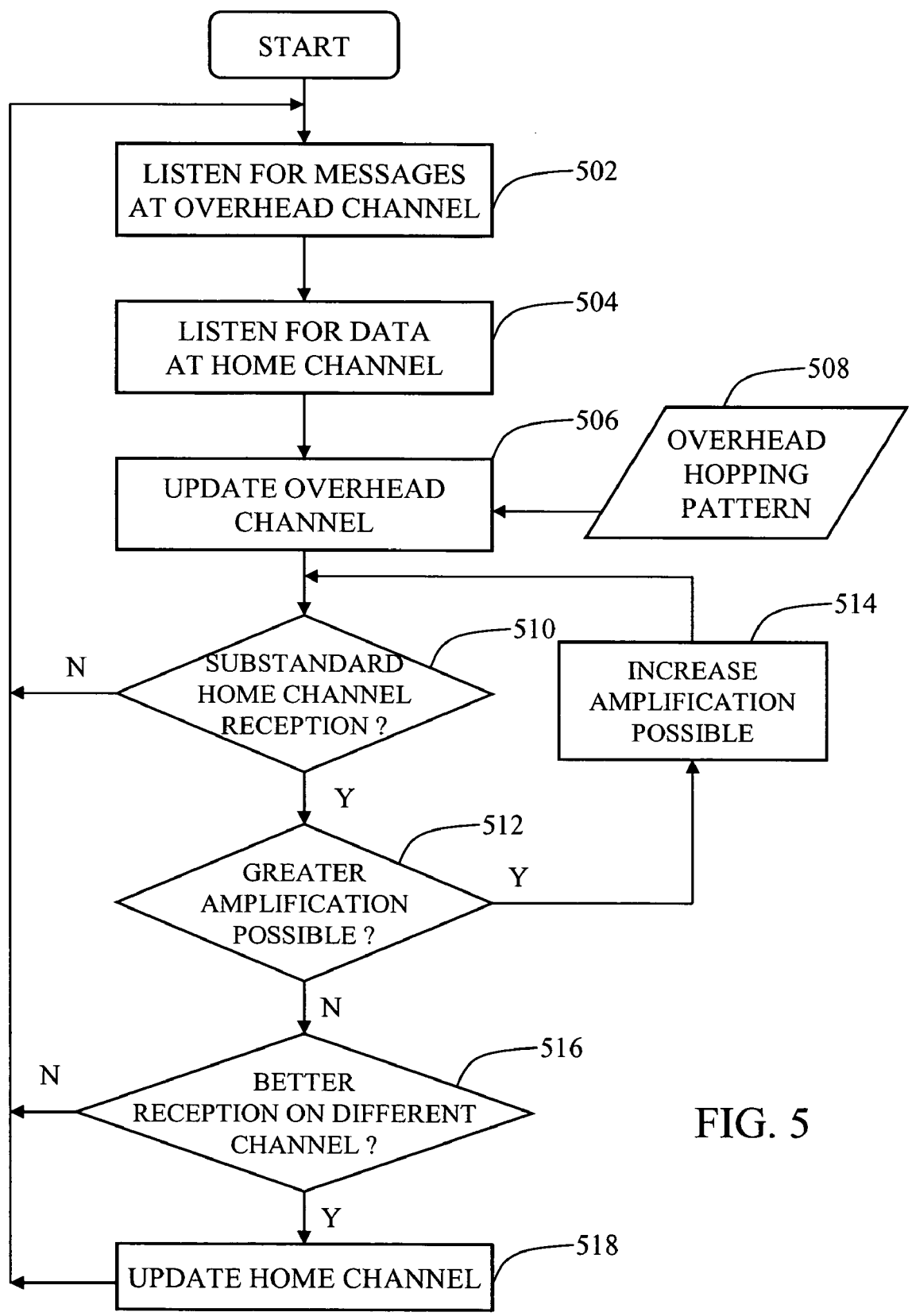
FIG. 5 is a flowchart of the operation of a MCDR.

As illustrated in the flowchart of FIG. 5, the MCDR 104 is adapted to listen (step 502) for one or more overhead messages in the initial two overhead slots on a current overhead channel (i.e., the overhead channel associated with the present frame) and to then revert to its home channel where it generally listens (step 504) for one or more data units transmitted to it. The MCDR 104 may also transmit (not shown) data units to another MCDR during one or more data slots on a different frequency channel. Upon completion of the current frame, the MCDR 104 retrieves (step 506) the next overhead channel assignment in accordance with the overhead hopping sequence (input 508) retained in local memory. In some embodiments, the MCDR 104 also evaluates (test 510) the reception of its home channel and determines (test 512) whether to increase receiver power or change its home channel. If the reception is substandard and increased receiver power available, the MCDR 104 increases (step 514) the amplification of the home channel at the receiver 206. If reception is substandard and increased receiver power unavailable, the MCDR 104 changes (step 518) its home channel to a different channel within the associated band assuming a better channel can be found (test 516).

Figure 6:
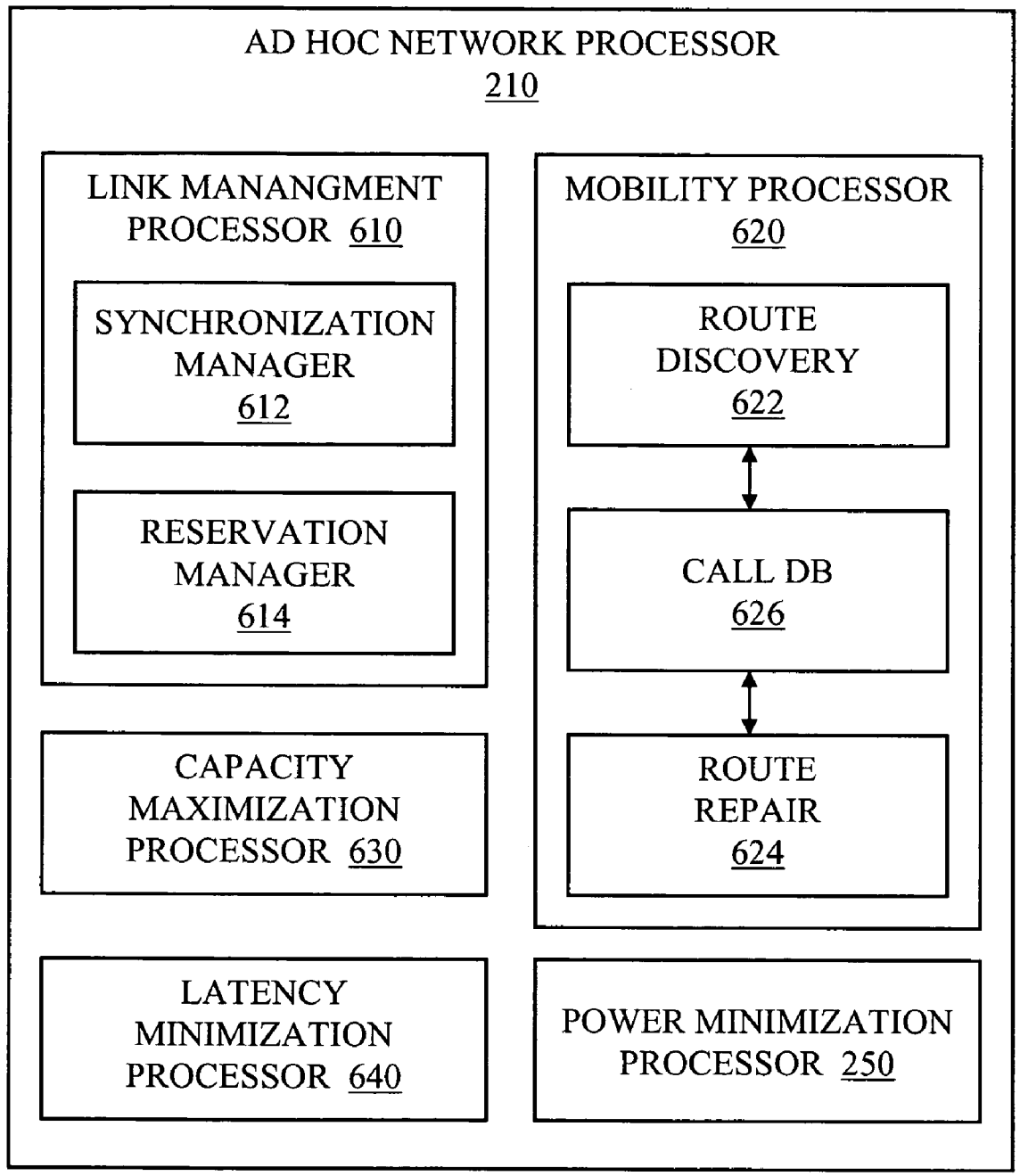
FIG. 6 is a functional block diagram of an ad hoc network processor.

Illustrated is FIG. 6 is a functional block diagram of the ad hoc network processor (AHNP) 210. The AHNP 210 in the preferred embodiment includes a link management processor 610 associated with media access control (MAC) operations including the implementation of a multiple access communication protocol channel such as TDMA; a mobility processor 620 associated with route discovery, call setup, and call maintenance; a capacity maximization processor 630 associated with multi-channel operation; a latency minimization processor 640 associated with intra-frame retransmission, and the power minimization processor 250. The link management processor 610 functions are discussed in more detail in context of FIG. 7, the mobility processor 620 functions are discussed in more detail in context of FIGS. 8-11, one or more capacity maximization processor 630 functions are discussed in more detail in context of FIG. 12, the latency minimization processor 640 functions are discussed in more detail in context of FIG. 13, and the power minimization processor 250 are discussed in more detail in context of FIG. 14.

The link management processor 610 includes a synchronization manager 612 and a slot reservation manager 614. The synchronization manager 612 and slot reservation manager 614 together enable a MCDR 104 to operably couple to the ad hoc network of MCDR employing a slotted TDMA reservation-based Aloha protocol. In accordance with this protocol, the MCDRs 102-106 synchronize their frame start times and overhead hopping sequence by consensus without a beacon signal provided by a central management unit such as a base station or satellite, for example. Thereafter, the MCDRs 102-106 explicitly reserve transmission slots for the exchange data using slot claim messages also known as reservation messages. Without proper synchronization, MCDRs are prone to transmit data at the same frequency at the same time in the same geographic area which may result in a collision necessitating the retransmission of the data.

In the preferred embodiment, the MCDRs temporally align their frames with the frames of one of the plurality of MCDRs referred to herein as the dominant MCDR. Each of the remaining MCDRs then conforms its timing to match that of the dominant MCDR. The dominant MCDR is identified using synchronization (SYNC) messages periodically exchanged between the plurality of MCDRs 102-106. In the preferred embodiment, each of the SYNC messages includes a sync ranking vector (SRV) providing pertinent information about the known dominant MCDR as well as the SYNC message's sender. The SRV includes sync timing information including slot and frame information as well as node information. The slot and frame information includes the slot—in the sender's frame—in which the SYNC message was sent as well as the time it was sent within the slot. The node information preferably includes an identifier of the sending node from which the SYNC message originated; the numbers of hops to origin, i.e., the number of hops to the dominant node; the sender's receiver power level or state, and the time-since-origin, i.e., the time that has elapsed since the dominant node was last heard, preferably in terms of a number of frames. The number of hops to the origin may be used by the recipient to infer the accuracy of the timing information in the SYNC message, which tends to be more accurate where the number of hops is low due to the timing error incurred at each hop. The time-since-origin may be used by the recipient to determine whether the dominant node has failed and whether a new dominant node should be selected. The SRV transmitted by a MCDR is that of the highest ranking MCDR of which it is aware.

Figure 7:
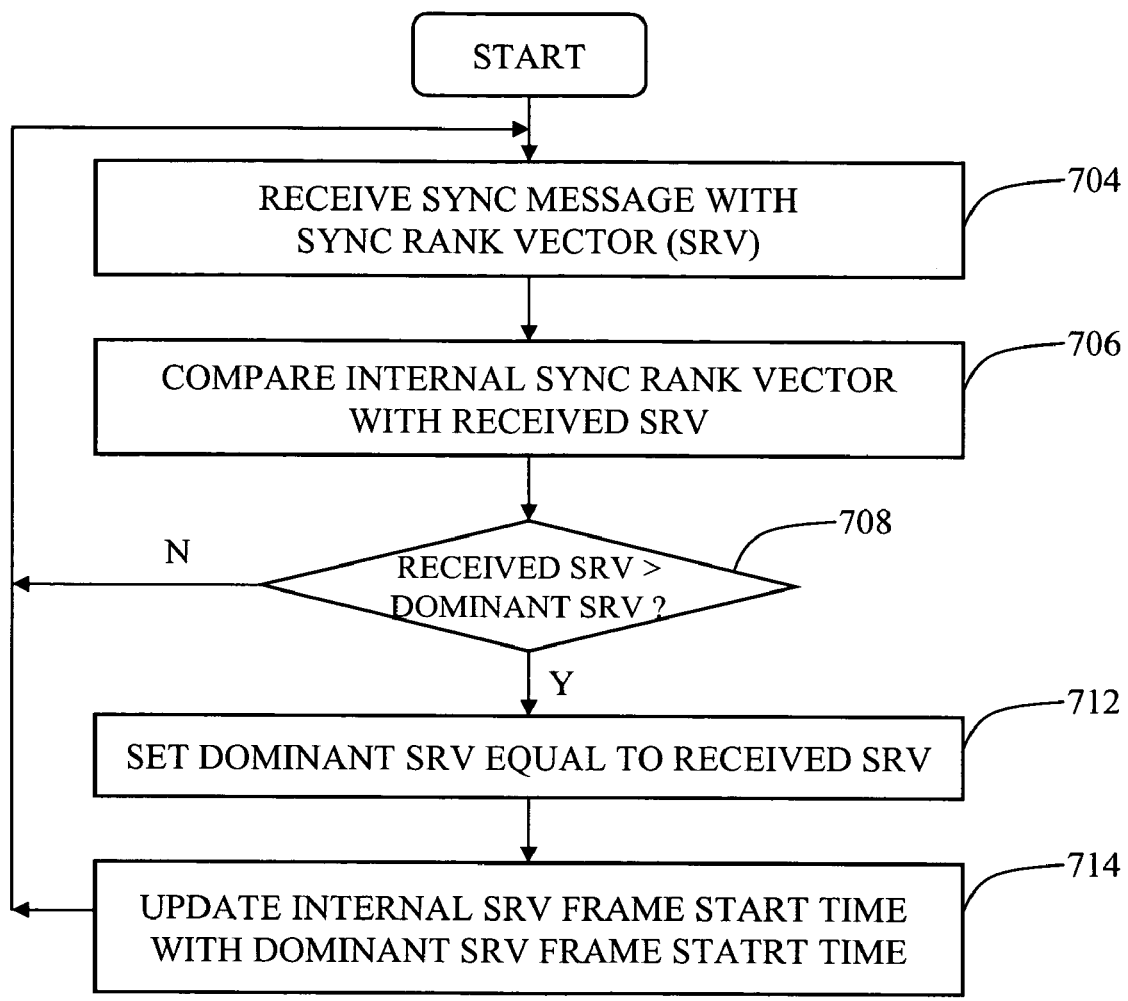
FIG. 7 is a flowchart of link management processor functions.

As illustrated in the flowchart of FIG. 7, when the MCDR 104 receives a SYNC message (step 704), it compares (step 706) the received SRV to the highest ranking MCDR known to it—i.e., a known dominant MCDR—including its own internal SRV. If the received SRV is superior to the known dominant MCDR (test 708), the MCDR 104 sets (step 712) its known dominant MCDR equal to the received SRV and updates (step 714) its own frame timing information, including the frame start time, with the frame timing information from the received SYNC message. If necessary, the MCDR 104 changes its frame start time to coincide with that of the dominant MCDR. The node receiving the SYNC message may determine the frame transmit time of the dominant node based on the slot and frame information in the SYNC messages in conjunction with the time at which the message was received. In particular, since the SYNC message may be transmitted at various positions within either of the transmitter's overhead slots, the receiving node generally measures precisely when—in the receiver's frame—the message is received. Using measured time and the message information, the recipient may determine the frame transmit times and adjust its own frame transmit time accordingly.

The MCDR 104 also generates and transmits its own SYNC messages with the frame timing information of the newly identified dominant MCDR, thereby enabling more remote nodes to synchronize themselves to the same dominant MCDR. In some embodiments, the MCDRs that determined to conform to the timing of the dominant MCDR change their frame start time by adjusting the current frame start time either forward or backward—which ever time change results in a smaller shift—in small and predetermined increments to permit each of the MCDRs in proximity to one another to make the temporal adjustment in a gradual and non-catastrophic manner.

Before the MCDR 104 may exchange voice data or other payload with one or more neighboring MCDRs, the MCDR 104 may schedule or otherwise claim one or more slots for transmitting data to the neighboring MCDRs or for transmitting various control message types to neighboring nodes. The protocol for claiming a data slot is different than the protocol for reserving an overhead slot, although both protocols are executed without the need of a single beacon, e.g., from a master base station or satellite, to coordinate the reservations. In the preferred embodiment, the MCDR 104 claims a data slot for transmitting to a receiving MCDR by monitoring the home channel of the receiving MCDR for one or more unused data slots, issuing a slot claim message, and receiving a slot grant message in return. A slot is in use locally if the MCDR 104 detects another MCDR transmitting on that channel during that slot. In the preferred embodiment, the slot is determined to be in use if the received signal strength—generally referred to as a received signal strength indication (RSSI)—detected by MCDR 104 during the first 100 microseconds of the slot exceeds a predetermined threshold. To claim an unused slot, the MCDR 104 then issues a slot claim message to the receiving MCDR in the unused slot after the initial 100 microsecond RSSI determination has shown that the slot is unused. If the slot is available for subsequent frames, the receiving MCDR grants the claim by returning an acknowledgement (ACK) message. Thereafter, the MCDR 104 may transmit data to the receiving MCDR on the recipient's home channel during the reserved slot in one or more subsequent frames. Slot reservations are deemed to be released after the slot goes unused for a predetermined number of frames. As can be appreciated, the reservation of slots is made between two MCDRs within a localized area, thus making the same slot and channel available to be reused between other MCDRs in one or more different regions of the network provided the received signal strength is below the predetermined threshold.

The overhead slots operate in a limited Carrier Sense Multiple Access (CSMA) manner. The one or more overhead slots of a frame are collectively treated as a single time interval referred to herein as a broadcast slot. The broadcast slot comprises a number of contention windows, the width of such windows being selected in accordance with the features of the radio used. The MCDR 104 reserves an overhead slot by (a) selecting a random contention window in which to begin radio broadcast, (b) monitoring the selected contention window for the presence of messages from other nodes, and (c) transmitting its own message if the slot is determined to be unused. Use is determined by sampling the received signal strength of the channel while waiting for the selected starting contention window. The sampled signal strength is then compared to a threshold to determine whether to transmit or whether to defer transmission. If the message is deferred, it is saved for a later transmission slot. The contention window system can be used to enforce a priority among several messages, by allowing only certain ranges of contention windows for each type of message. Earlier windows pre-empt later windows. For example, the first windows may be used for high priority messages such as call setup messages, while later windows may be used for low-priority messages such as synchronization messages.

Figure 8:
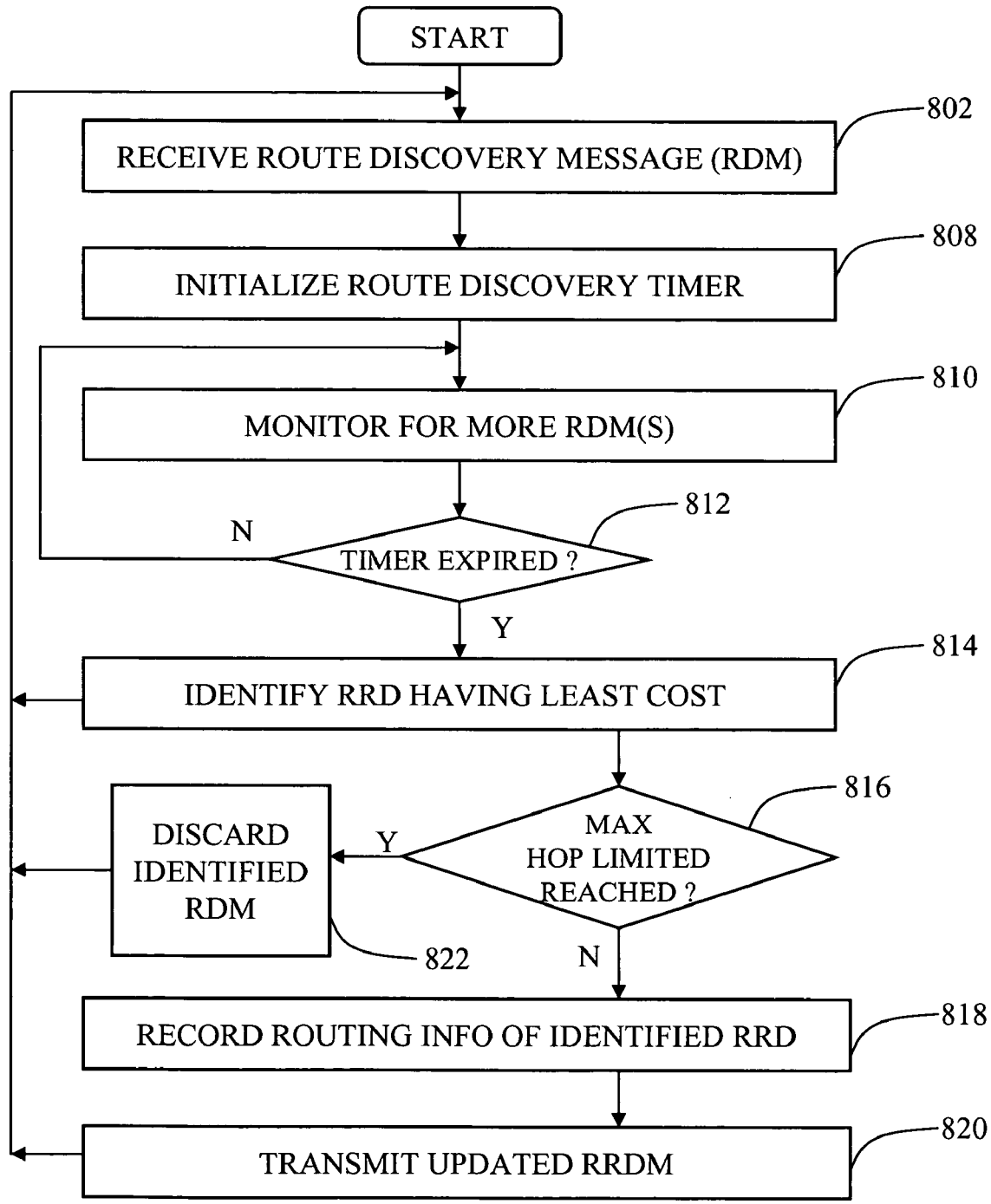
FIG. 8 is a flowchart of a method of implementing route discovery.
Figure 9:
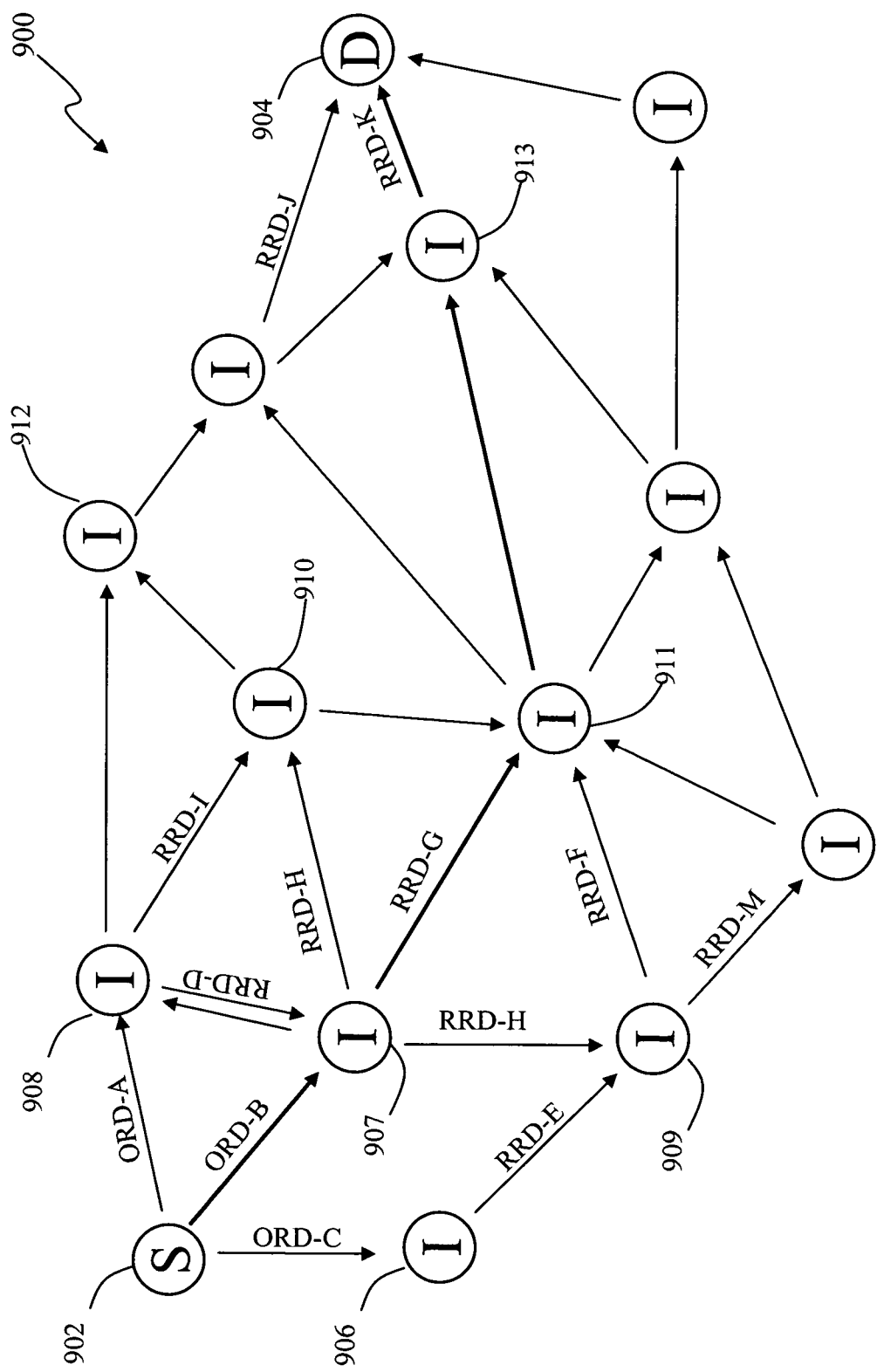
FIG. 9 is an exemplary ad hoc network.

Illustrated in FIG. 8 is a flowchart of a method of implementing routing discovery for determining a path between a source node and a destination node in the exemplary ad hoc network 900 shown in FIG. 9. The source node as used herein refers to the node used to initiate a call while the destination node refers to the intended recipient of the call. The procedure employs a route discovery message that is broadcast on the overhead channel by a source node and selectively re-broadcast by intermediate nodes to prevent indiscriminate flooding in the network 900, thereby making the protocol well suited for ad hoc networks including both a small and large number of nodes.

There are two forms of route discovery messages (RDMs). The initial route discovery message transmitted by the source node is referred to herein as an original route discovery message (ORDM) while the updated route discovery message transmitted by one or more intermediate nodes is referred to herein as a relayed route discovery message (RRDM). An ORDM preferably includes a source node identifier, a destination node identifier, and a sequence number—which, taken together, form a unique ORDM identifier—as well as a maximum allowed hop count value. The sequence number is preferably a semi-unique number assigned to each message, the number typically being incremented concurrent with each assignment until it reaches a predetermined maximum at which point it is re-initialized. A RRDM preferably includes the sequence number or other identifier associated with the ORDM, an identifier indicating the intermediate node relaying the updated route discovery message, and an updated hop count or other path cost information. The cost associated with a path to the source node may also be based on a combination of one or more metrics including interface speed, connection quality including received signal strength, and the residual power level of the battery of one or more upstream intermediate nodes. The term upstream intermediate node as used above refers to a node in the message's propagation path from the source node.

Upon receipt (step 802) of a RDM (ORDM or RRDM) by the MCDR 104, the MCDR 104 initializes a route discovery timer (step 808) and continuously monitors the receiver 206 for receipt of additional RDMs until the route discovery timer expires (test 812). Additional RDMs may be received where, for example, the same route discovery message propagates through different prospective paths through the network before reaching the given node. The set of possible additional RDMs may include an ORDM received directly from the source node, one or more RRDMs received indirectly via an alternative path, or both. If a plurality of RDMs are received, the MCDR 104 compares the path cost information of the plurality of RDMs and identifies the RDM having the least cost path to the source node. The node from which the RDM having the path with the least cost is identified as the optimum route for purposes of forwarding subsequent data between the source node and the given node.

The MCDR 104 generally records (818) the routing information from the identified RRDM associated with the least cost path and transmits (step 820) an updated RRDM. In the preferred embodiment, the routing information recorded from the identified RRD preferably includes the identifier of the node from which the RDM having the lowest path cost was received, although one or more nodes immediately upstream of the current MCDR 104 may also be conveyed in the RDM and recorded by the given MCDR 104. The updated RRDM transmitted preferably includes an identifier of the MCDR transmitting the RRDM and an updated hop count representing the cumulative number of hops back to the source nodes. The original information pertaining to the source and destination nodes as well as the ORDM identifier may also be preserved in the updated RRDM as well as subsequent rebroadcasts. If the maximum hop count of the identifier RDM is reached, however, the hop counting testing (test 816) is answered in the affirmative and the RDM is discarded (step 822) to prevent flooding of RRDMs in the network. In the preferred embodiment, the maximum hop count is a field defined in the ORDM and the value subsequently decremented at each node through which the RDM propagates until the value reaches zero at which point the message is discarded.

Illustrated in FIG. 9 is an exemplary ad hoc network with which the preferred embodiment may be employed. To discover a route from the source node 902, S, to the destination node 904, D, via a plurality of intermediate nodes, I, the source node transmits an ORDM received by intermediate nodes 906-908. The intermediate nodes 906-908 respond by automatically transmitting RRDMs, which are in turn received by intermediate nodes 909-912, for example. Upon receipt of an RRM—either an ORDM or RRDM—each intermediate node monitors for additional RRMs having the same ORDM identifier and transmits only the least cost RRM, thereby suppressing the transmission of RDMs representing inferior paths (e.g., higher cost) through the ad hoc network 900 back to the source node 902. Intermediate node 907, for example, may receive an ORDM-B from the source 902 as well as an RRDM-D from intermediate node 908. Assuming cost is a function of hop count alone, intermediate node 907 selects ORDM-B as the least cost and broadcasts a RRDM, which is received by intermediate nodes 909-911. Similarly, intermediate node 911 selects the RRDM with the least cost, namely RRDM-G and broadcasts it forward. This process is repeated until the destination node 904 receives one or more RRDMs with which it identifies the one or more neighboring MCDRs on the least cost path to the source node 902. In the preferred embodiment, destination node 904 receives an RRDM including the source node identifier from the penultimate intermediate node 913. As one skilled in the art will appreciate, the RRDM received by the destination node 904 may in some embodiments further include identifiers of one or more intermediate nodes in the least cost path including the next most intermediate node 911 beyond the intermediate node 913.

Figure 10:
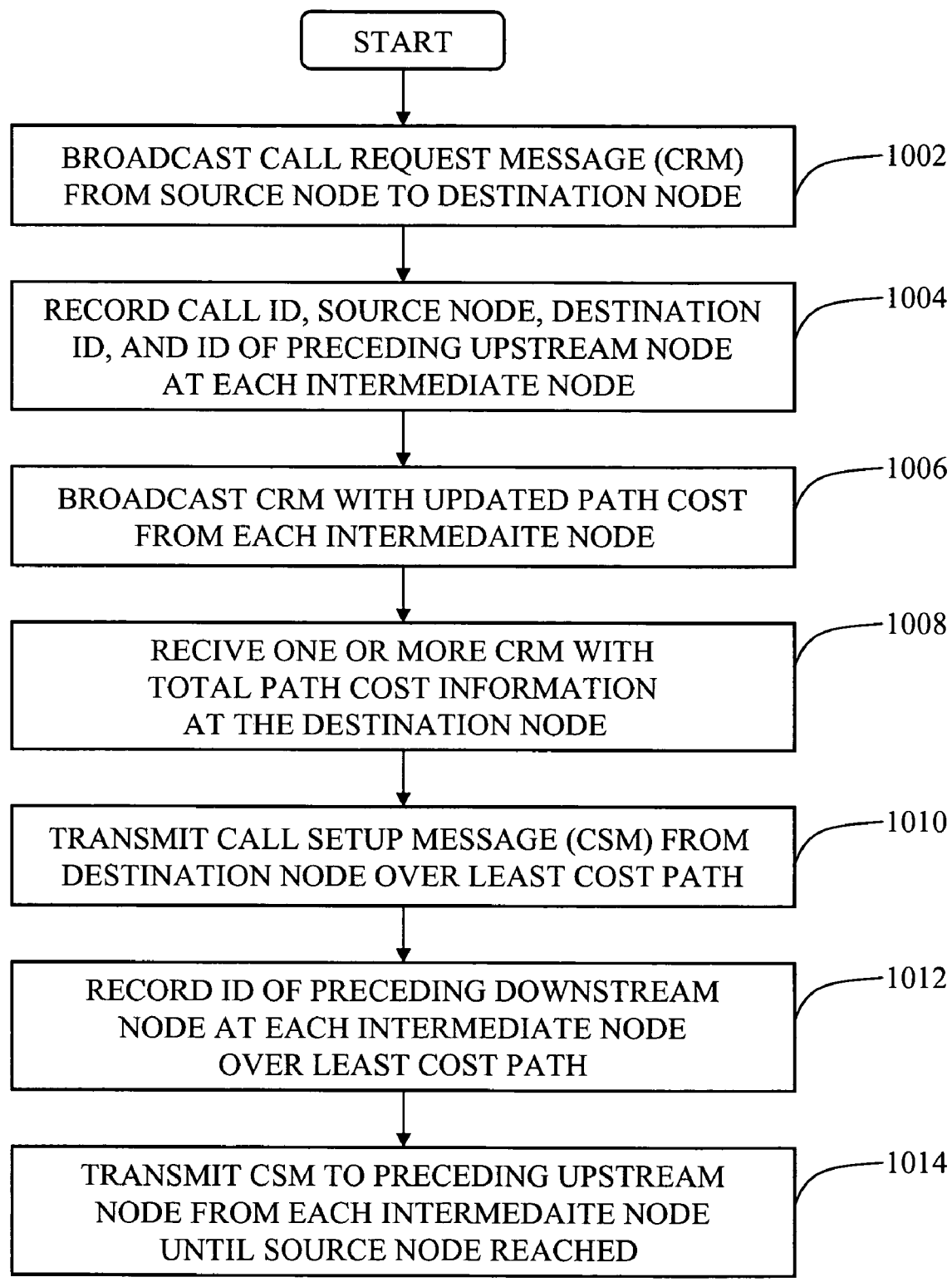
FIG. 10 is a flowchart of a process of constructing a call.

In some embodiments, the ORDM broadcast by the source node 902 is or further includes a call request for the purpose of establishing a two-way communication session with the destination node. The process of constructing a call is illustrated in FIG. 10. Analogous to the route discovery protocol described above, the source node attempting to establish the call broadcasts (step 1002) an original call request message (CRM) which is rebroadcast by intermediate nodes in the form of a relayed CRM. The original CRMs and relayed CRMs all include a unique call identifier. The intermediate nodes that receive either an original CRM or relayed CRM record (step 1004) record the call identifier and the identifier of the node from which the CRM associated with the least cost path was received. The CRM preferably further includes the source and destination node identifiers. Each intermediate node then rebroadcasts (step 1006) a new CRM which has been updated to further include a revised cumulative path cost estimate and the sender's own identifier and, in some embodiments, one or more additional upstream node identifiers. The process is repeated until the destination node receives (step 1008) one or more CRMs, after which the destination node may respond with a call setup message (CSM) transmitted (step 1010) directly to the penultimate hop, i.e., the preceding upstream node, in the least cost path to the source to accept the call. When accepting the call, the destination nodes generates a path cost associated with each of the one or more CRMs received, identifies the CRM associated with the least cost from the source node to the destination node, and identifies the penultimate node in the least cost path which is the node from which the CRM having associated with the least cost.

When responding to a call request, the destination nodes 904 may reply with a call setup message (CSM) transmitted directly to the penultimate hop in the least cost path. The penultimate intermediate node and each intermediate node that receives the CSM extracts the identifier of the node relaying the message as well as the original ORDM identifier corresponding to the source node's ORDM. The ORDM identifier may then be used to look up and retrieve the information about next node in the least cost path in the direction of the source node. The next node is the upstream node from which the given node previously received a call request message having the least cost path back to the source nodes. Each of the intermediate nodes sends an updated CSM with the sender's identifier directly to the next node in the direction of the source node until it is received by the source node, thereby confirming that the destination has accepted the requested call and that the communication route between the source and destination nodes has been successfully established. In some embodiments, the updated CSM may further include the identifiers of one or more additional nodes in the direction of the destination node. With each intermediate node having a record of the adjacent upstream and downstream node with which it is to exchange data, each intermediate node may then begin relaying voice data units associated with the call to the nodes in either direction along the least cost path. The nodes in either direct from a given node, n, are referred to herein as the next node, n+1, and the previous node, n−1. The ORDM identifier, next node, and the previous node may be stored locally in each intermediate node in a data structure referred to herein as a call data structure. In some embodiments, the MCDR 104 is further adapted to exchange (via RDMs) and retain a plurality of previous nodes, preferably two, and store a plurality of next nodes, preferably two, for purposes of implementing route repair discussed in more detail below.

In the preferred embodiment, the call setup message comprises the following:

a) 1 Byte—Message Type identifying the message as a call setup message in contrast to a route discovery message more generally;

b) 3 Bytes—Origin Node identifier, preferably a product serial number, uniquely associated with the source node originating the call;

c) 1 Byte—Origin Node Route Discovery Sequence Number (ONRDSN) uniquely identifying the call or potential call;

d) 3 Bytes—Destination Node identifier, preferably a product serial number, uniquely associated with the destination node to which the call is directed;

e) 1 Byte—Max Hop Count indicating the maximum number of nodes through which the message may be transmitted before being dropped;

f) 3 Bytes—PriorNodeID including an identifier, preferably a product serial number, uniquely identifying the previous node from which the message was transmitted;

g) 3 Bytes—PriorPriorNode ID including an identifier, preferably a product serial number, uniquely identifying the node that transmitted the message to the previous node;

h) 1 Byte—CurrentHopCount indicating the number of nodes through which the message has currently been transmitted;

i) 1 Byte—RouteQuality indicating a cumulative cost associated with the path between the source node and the destination node; and j) 1 Byte Checksum used to test the integrity of the message and detect data corruption.

Figure 11:
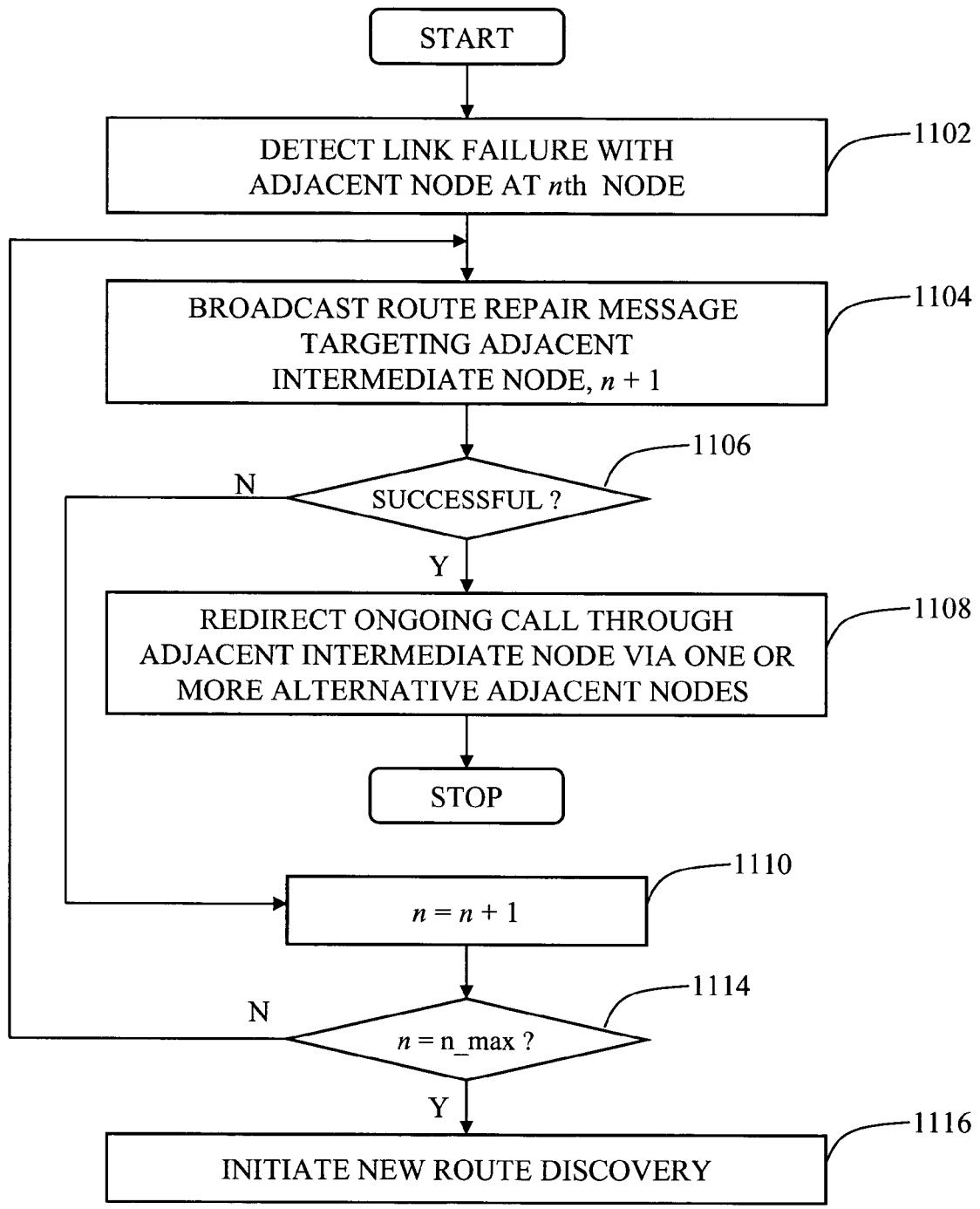
FIG. 11 is a flowchart of a procedure for performing localized route repair.

Illustrated in FIG. 11 is a procedure for performing localized route repair. Route repair may be used to provide an alternate path around a failed communication link or disconnected intermediate node, for example. Localized route repair efficiently determines the alternate path between the nodes on the least cost path on either side of the failure without the need to re-establish a complete path from the source node to the destination node. An intermediate node—a MCDR in accordance with the preferred embodiment—upstream of a link failure may detect a link failure by, for example, listening for the adjacent node's retransmission, listing for an explicit acknowledgement (ACK) message, or detecting an excessive number of failed transmissions, or detecting an unacceptably low received signal strength.

When the nth node in the least cost path detects (step 1102) a failure with the (n+1)th intermediate node, the nth node broadcasts (step 1104) a route repair message (RRM) attempting to re-establish contact with the adjacent (n+1)th via one or more intermediate nodes. If successful (step 1106), the nth MCDR will receive a route repair confirmation message including the identifier of the first node of one or more nodes in the alternate path to the (n+1)th node. The on-going call is then redirected (1208) through the alternate path without terminating the pre-existing links from the source to the nth node or the established links from the (n+1)th node to the destination node.

If the attempt to repair the route to the (n+1)th node fails, and if the nth node retains a subset of the least cost path including a listing of two or more nodes in the direction to the destination node, for example, the nth node advances (step 1110) to the next node, i.e., (n+2)th node, with which to attempt to establish a new route. In particular, the nth node broadcasts a second route repair message directed to the (n+2)th and then awaits a message confirming the new alternate route. If successful (step 1106), the on-going call is routed (step 1108) through one or more intermediate nodes bypassing the nth node. If unsuccessful, however, the process by which the nth node attempts to establish a new route to more remote intermediate nodes is repeated until the maximum number of nodes is reached (step 1114) or the listing of downstream nodes retained by the nth node exhausted. If the nth node fails to repair the route to a downstream node, it notifies the source node which may initiate (step 1116) a new route discovery procedure to the destination node.

In the preferred embodiment, the first route repair message is a call request message including the call identifier of the ongoing call, a source node identifier equal to the identifier of the nth node, a destination node identifier equal to the identifier of the (n+1)th node, and a relatively small maximum hop count equal to two or three in the preferred embodiment. In addition, the route repair confirmation is a call setup message including the call identifier of the ongoing call, thereby maintaining continuity between the new portion of the call path and the preexisting portion of the call path. In the manner described above, each of the one or more new intermediate nodes between the nth node and (n+1)th node advertises its identity to the neighboring nodes by including its identifier in the updated call request message and the corresponding updated call setup message. The on-going call may then proceed through each of the previously identified nodes and each of the newly added intermediate nodes.

Fast Frequency Switching

Figure 12:
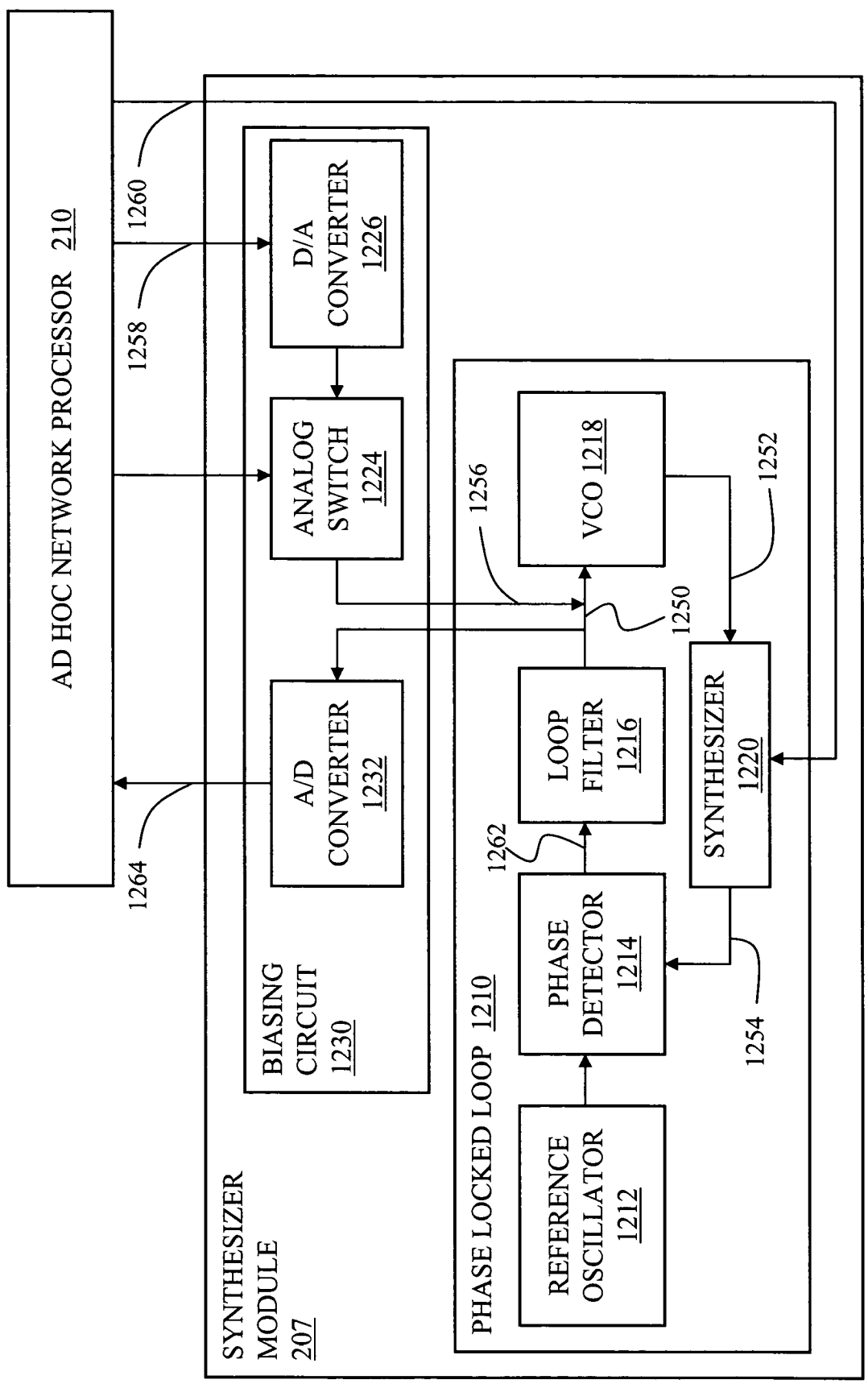
FIG. 12 is a functional block diagram of a carrier frequency synthesizer module.

Illustrated in FIG. 12 is a carrier frequency synthesizer module for generating the carrier frequency used to demodulate received signals as well as modulate transmitted signals in a MCDR in accordance with some embodiments of the present invention. The synthesizer module 207 comprises a phase locked loop (PLL) 1210 and a biasing circuit 1230. Although the PLL 1210 is consistent with previous PLLs known by those skilled in the art, the biasing circuit is adapted to induce substantial changes in the desired carrier frequency in much shorter time periods than the previous PLLs.

The PLL 1210 preferably includes a reference oscillator 1210, a phase detector 1214, a loop filter 1216, a voltage controlled oscillator (VCO) 1218, and a synthesizer 1220. The reference oscillator 1210 is generally a crystal oscillator adapted to produce a fixed reference signal with a frequency on the order of one to 100 megaHertz. The reference oscillator 1210 output is provided to the phase detector 1214 which produces an output 1262 indicative of the phase difference between the reference oscillator 1212 output and the synthesizer output 1254. The loop filter, which is well understood in the art, produces a signal having a corrective voltage 1250 in response to the phase detector output 1262. The VCO 1218 produces an output signal having frequency proportional to the corrective voltage 1250. The synthesizer 1220 provides a feedback loop by then stepping down the VCO output frequency 1252 using an N/M scaling factor 1260—where N and M are integers—provided by the AHNP 210 driving the circuit to the intended carrier frequency.

The capacity of a prior art PLL 1210 to hop between overhead slot frequencies and the data slot frequencies is generally severely restricted by the inherent slewing rate of the loop filter 1216. To overcome the limitations of the PLL, the preferred embodiment employs a biasing circuit 1230 adapted to accelerate the rate at which the PLL 1210 converges on the desired carrier frequency 1252. The biasing circuit 1230 comprises a digital to analog (D/A) converter 1226 and an analog switch 1224. The D/A converter 1226 injects a signal with a biasing voltage 1256 into the VCO input to induce a course adjustment to, i.e., a large frequency jump in, the carrier frequency at the time of transition between an overhead slot frequency and a data slot frequency. The digital input 1260 to the D/A converter 1226 is determined by the ADNP 210 based on samplings 1264 of the corrective voltage 1250 acquired by the A/D converter 1232. The A/D converter samplings serve to calibrate the VCO input 1250 and compensate for temperature-dependent changes, for example, in the VCO output. The analog switch 1224 serves to gate the biasing voltage 1256. The N/M scaling factor 1260 may be updated concurrently with the application of the biasing voltage 1256.

During power up and periodically during operation, the AHNP 210 preferably calibrates each of the plurality of frequency channels in the band by (a) programming the synthesizer 1220 for a channel, (b) waiting for a period associated with the frequency switching time, and (c) sampling the corrective voltage 1250 with the A/D Converter 1232. In normal operation, the AHNP 210 may accelerate the loop switching time by (a) programming the D/A converter 1226 with an appropriate biasing voltage, (b) closing the analog switch 1224, (c) programming the synthesizer 1220, and then (d) opening the analog switch again. A short loop switching time may still be required as the loop corrects from the corrective voltage to the intended biasing voltage.

Figure 13:
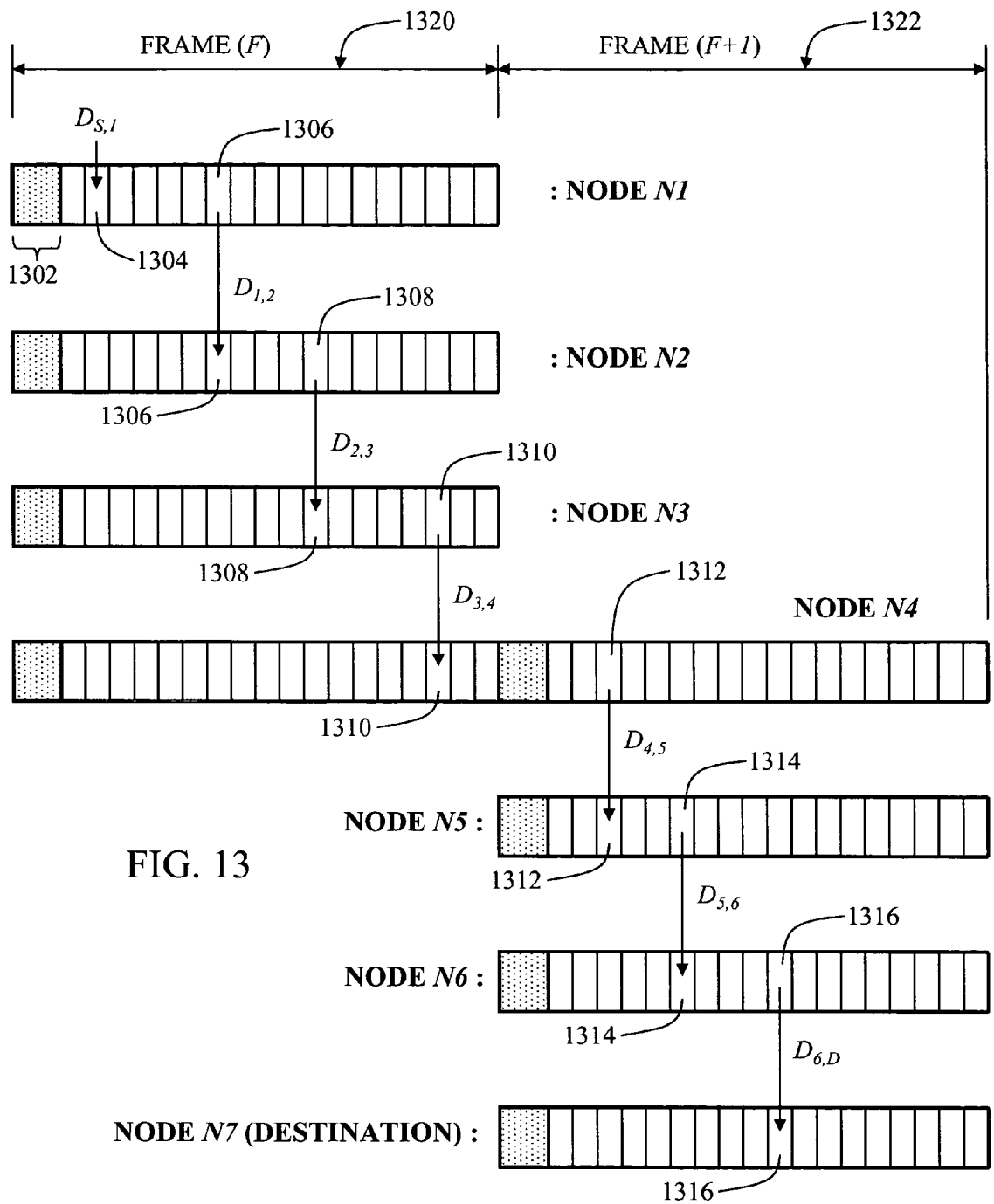
FIG. 13 is a diagrammatic representation of two successive frames used to transmit a voice data unit through a plurality of nodes.

Illustrated in FIG. 13 is a diagrammatic representation of a two successive frames used to transmit a voice data unit through a plurality of nodes using a minimal number of frames, thereby reducing latency. In particular, FIG. 13 illustrates a first frame 1320, frame (F), associated with a first time interval and a second frame 1322, frame (F+1), associated with a second time interval immediately thereafter. The first frame 1320 and second frame 1322 are each reproduced four times to illustrate the slot reservation particular to a first node N1, a second node N2, a third node N3, a fourth node N4, a fifth node N5, a sixth node N6 and the destination node N7. Each frame shown adjacent to a node N1-N7 constitutes a graphical illustration of a slot map used to identify reserved and unreserved slots, for example, in the transmitter/receiver schedule for the adjacent node. The frame adjacent to each of the nodes N1-N7 indicated includes one or more overhead slots 1302 and a plurality of data slots. Since the nodes N1-N7 are half duplex, the one frame may be used to schedule slots used for reception of messages as well as the transmission of messages during a given frame period.

In accordance with the preferred embodiment of the latency minimization processor 640 present in each of the nodes N1-N7 uses intra-frame retransmission of voice data to reduce latency. In the preferred embodiment, a data unit determined to be relayed by a MCDR is preferably received and transmitted by the MCDR within the span of a single frame when possible. In particular, a voice data unit may be received in one data slot and then retransmitted by an intermediate node in a subsequent slot of the same frame. The slot used to receive and the slot used transmit may be consecutive slots or be separated by one or more slots interposed therebetween. In the extreme, assuming all data slots were available and consecutive receive and transmit slots were employed at each intermediate node, a voice data unit could be propagated through a number of intermediate nodes equal to half the number of data slots present in a frame.

Intra-frame data relay is illustrated in FIG. 13 where voice data is relayed by a plurality nodes in the network in the time associated with a lesser number of frames, for example, after a call request and call setup messages has propagated between the source node (not shown) to the destination node N7 and the intermediate nodes N1-N6 configured to exchange data there between. In this exemplary embodiment, voice data is transmitted from the source node through six intermediate nodes to the destination node N7 within the elapse time of two frames. As shown in the upper-most frame showing the slot transmission schedule for intermediate node N1, voice data $D_{S,1}$ is transmitted from the source node to the first node N1 using a first data slot 1304 In the preferred embodiment, the latency minimization processor of the source node attempts to reserve a first slot in which to retransmit the data one or more data slots after it is received. The first node N1 then re-transmits the data unit $D_{1,2}$ to the second node in a second slot 1306 of the same frame 1320 if available. The second node N2 receives the data unit $D_{1,2}$ in slot 1306 and re-transmits the data unit $D_{2,3}$ to the third node in slot 1308. The third node, in turn, receives the data unit $D_{2,3}$ and re-transmits the data unit $D_{3,4}$ to the fourth node in a slot 1310. If there are additional intermediate nodes preceding the destination node, the fourth node N4 buffers the data unit $D_{3,4}$ received in the first frame 1320 and re-transmits it using a slot 1312 of the subsequent frame 1322. The process by which the voice data unit is received and transmitted within a single frame or across two frames is repeated at each intermediate node in the least cost path until the data unit $D_{6,D}$ is received by the destination node.

It is assumed in the preceding discussion that appropriate slot reservation requests have been transmitted and reservation acknowledgements received. In the preferred embodiment, the latency minimization processor 640 of each node N1-N7 is adapted to reserve a data slot for transmission that is separated from the data slot for reception by one or more intermediate slots. In the preferred embodiment, the number of intermediate slots selected is preferably between two and four slots, the precise number being randomly selected by each give node to prevent contention issues that may occur if multiple nodes compete for the same slot number each frame.

Figure 14:
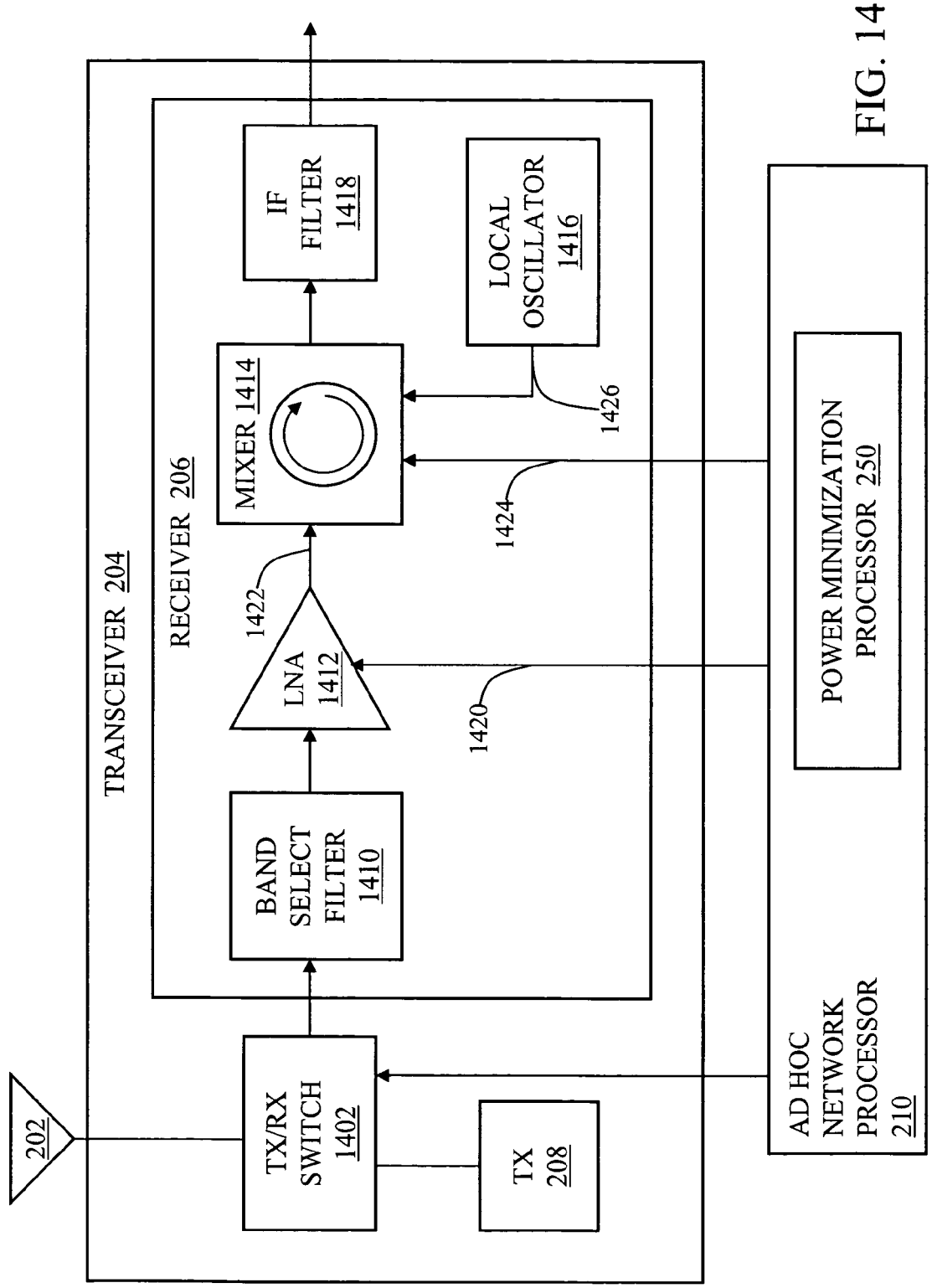
FIG. 14 is a functional block diagram of a receiver.

Illustrated in FIG. 14 is a receiver 206 used to conserve power and maximize capacity, in accordance with the preferred embodiment of the present invention. The receiver 206 comprises a band select filter 1410, an amplifier 1412, a mixer 1414, a local oscillator 1416, and an intermediate frequency (IF) filter 1418. The band select filter 1410—which is operatively coupled to a transmitter/receiver switch 1402 used to dynamically select between a transmitter channel and a receiver channel—filters the antenna 202 output and passes one or more frequency channels within the frequency band supported by the MCDR 104, which is half-duplex. The amplifier 1412, preferably a low noise amplifier (LNA), possesses two power states, namely a power-on state for increasing the sensitivity of the receiver 206 and a power-off state in which the LNA is bypassed. The selected state 1420 is determined by the AHNP 210 based on the received signal strength and MCDR's power reserves, for example.

The received signal 1422, whether amplified or not, is stepped down by the mixer 1414 to an intermediate frequency preferably on the order of 1.024 megaHertz below the center frequency using a local oscillator frequency 1426 provided by a local oscillator 1416. In the preferred embodiment, the local oscillator frequency 1426 is derived from the VCO output signal 1252 provided by the synthesizer module 207. In accordance with the preferred embodiment, the mixer includes a variable power input 1424 adapted to received a low power level sufficient to demodulate the input signal 1422 and a high power level that increases the linearity of the mixer and rejects intermodulation. The mixer power state is determined by the power minimization processor 250. Although the high power level enhances the MCDR's ability to detect weak signals or combat intermodulation degradation, the low power level is generally employed when the received signal quality is adequate in order to conserve power. In the preferred embodiment, the mixer high power level is activated when the received signal strength (RSSI) is relatively high but the integrity of the received data is relatively poor, i.e., a low bit error rate. A high RSSI and poor integrity, i.e., low bit error rate, for example, may indicate the presence of intermodulation or other interference due to the proximity of a strong transmitter, for example, operating in the same frequency band but a different channel frequency. The LNA power state and the mixer power state are independently controllable.

The power minimization processor 630 is further adapted to selectively power-on and power-off one or more components, devices, stages, modules or processors. In the preferred embodiment, for example, the capacity maximization processor 630 is adapted to disable the packetization module 220 and the compression module 230 when the MCDR 104 is serving as an intermediate node only and not an endnode participating in a call.

Wireless Communication Device with User Interface

In some embodiments, the MCDR 104 is further includes a user interface and table with the name and MAC address of one or more other MCDRs reachable via the MCDR 104, The user interface face may be used to select and designate a call recipient from a plurality recorded users, thereby avoiding the need to enter a complete MAC address or serial number of the destination node before placing each call. The table may further include telephone numbers, serial number, or combination thereof also used to place calls to recipients without entering the complete number before each call. In the present invention each node has an associated human language name assigned by the user as well as a MAC address for the device. The human language name, preferably an alphanumeric string, may include the (a) name of the user, (b) a function of the user that the device is assigned to such as the title of the user, the organization role of the user, and/or a description of the user, and/or (c) a name assigned to the device. According to the present invention each node further utilizes the network protocol to automatically discover the human language name and MAC address of each device operating on its network, and present the human language names of the other nodes to the user in the form of a list. The user then has the ability to find a human language name on the list via a scrolling operation presented on the display, and select it, which results in a call being place to the node having the associated MAC address. In an alternate embodiment of the invention the human language name of the nodes further contain hierarchal grouping information such as a group name for each node and the list presented to the user may be arranged according to such group names.

Figure 15A:
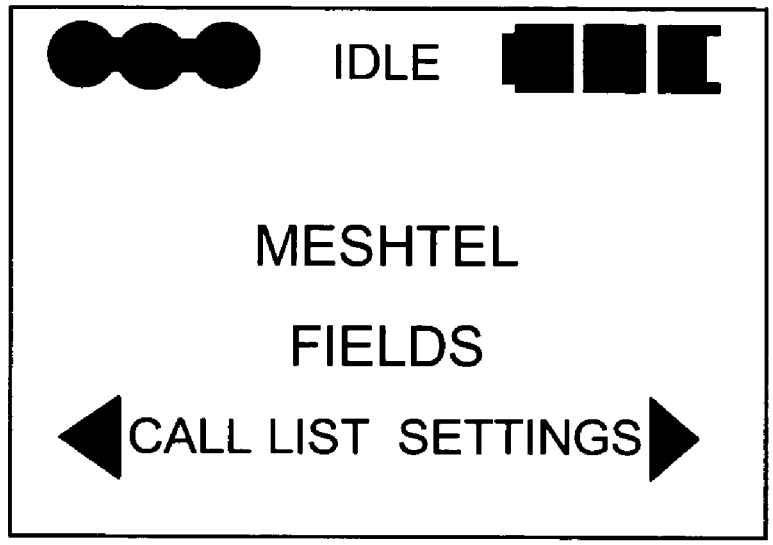
FIGS. 15A-15E are screen shots associated with a MCDR.
Figure 15B:
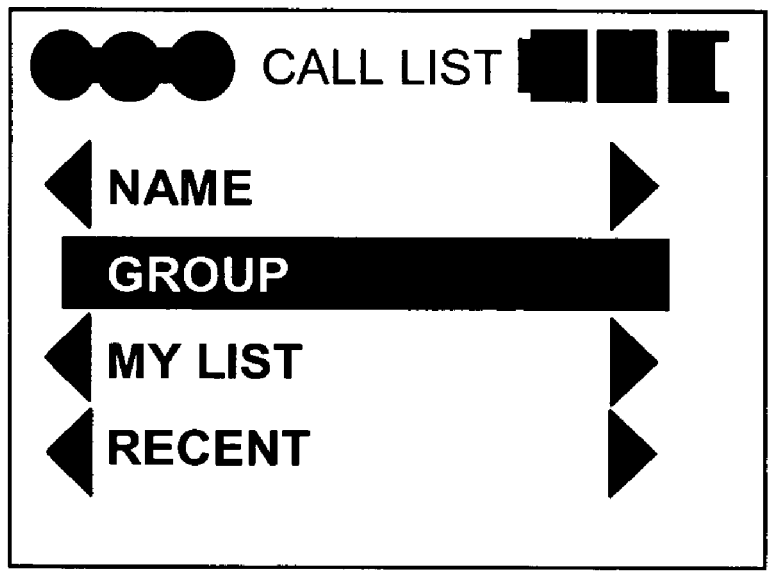
Figure 15C:
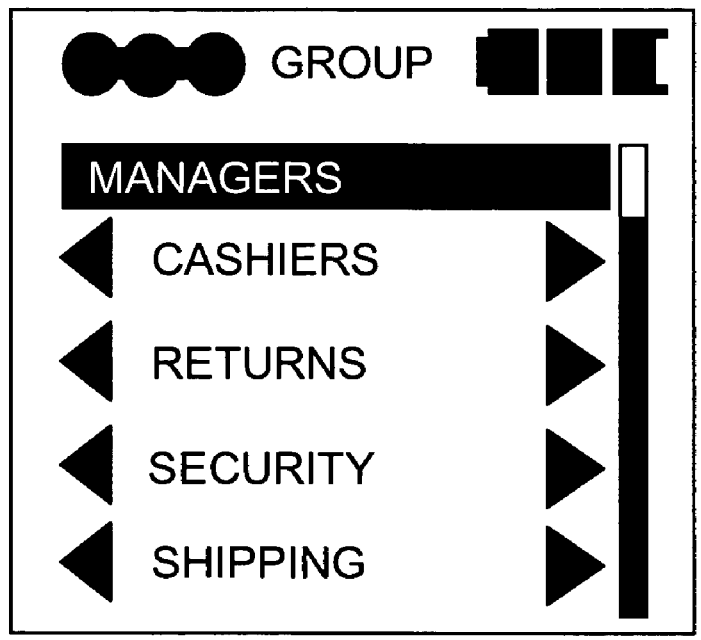
Figure 15D:
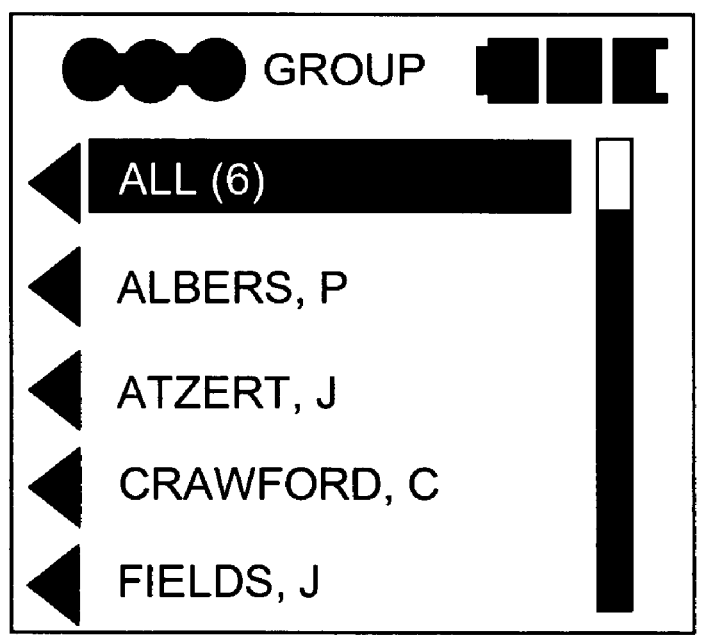
Figure 15E:
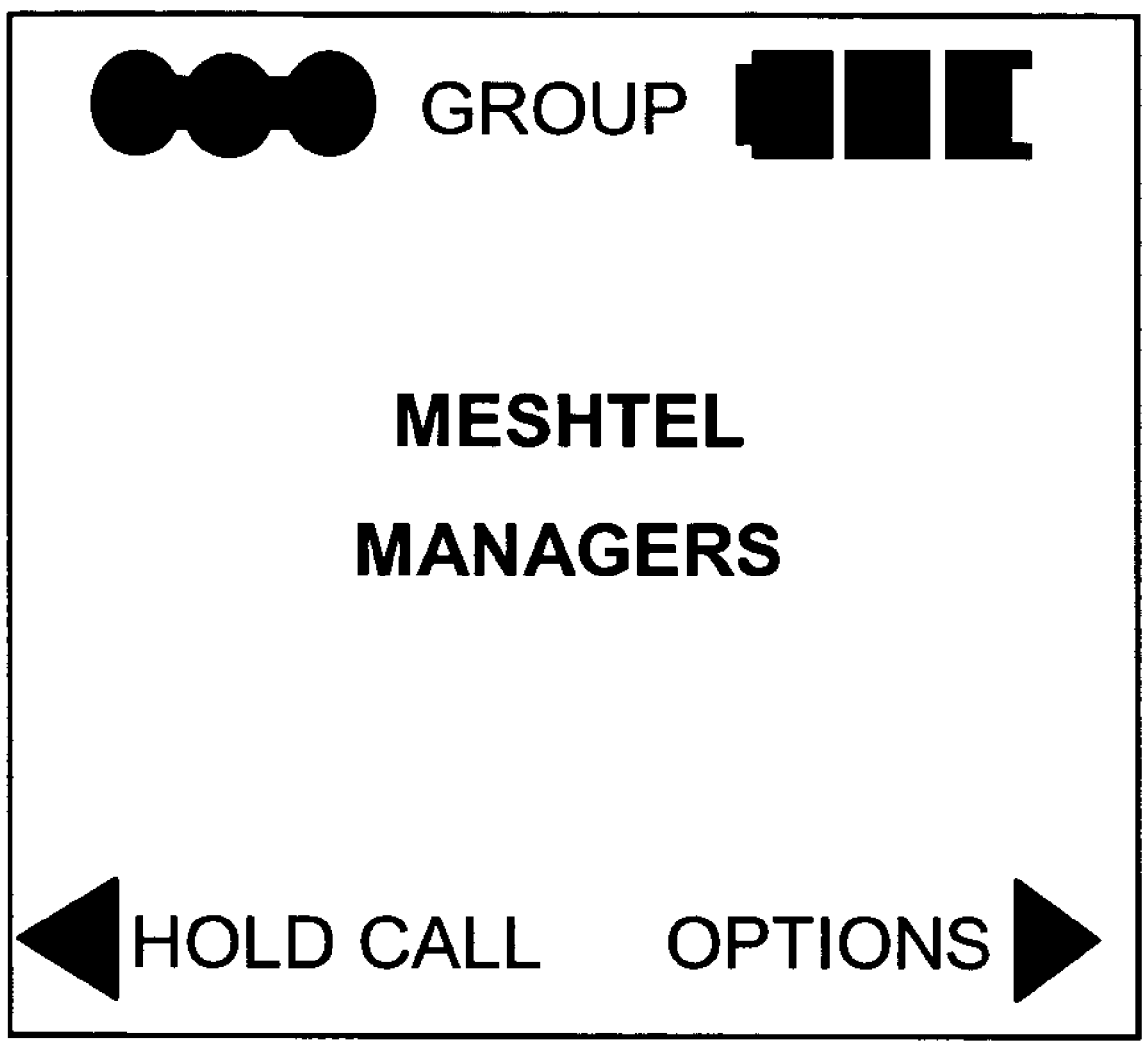

As illustrated in WCDR screen shots of FIG. 15A-15E, the user is presented with an opening screen (FIG. 15A) from which the user may select a top level human language name category called GROUP (FIG. 15B), select a mid-level category called MANAGERS (FIG. 15C), select one or more human language names in that mid-level category to which to call or contact (FIG. 15D). Once a call is initiated, the user is presented a screen to place the call on hold, for example (FIG. 15E).

In the preferred embodiment each new node—once it powers up and acquires synchronization—emits a single Node Broadcast Message (NBM) containing the human language information of the node as well as its MAC address, which then propagates throughout the network in the same manner as a RDM. A node receiving this message stores the information in its Node List which contains a record of all known nodes. Each node periodically opens a connection with each of its immediate neighbor nodes and exchanges Node Lists with them. In the event that a node has recently joined the network it immediately requests Node Lists from its neighbors. Nodes which are established on the network periodically request Node Lists from their neighbors at a relatively slow rate, once every ten seconds, for example. In the event that an established node learns of a new node from a neighbor node, it makes a record of the node and emits a Node Broadcast Message to broadcast information about the previously unknown node to the rest of the network.

Multicast Communications

In some embodiments of the present invention, the MCDRs are adapted to provide multicast communications in addition to or in the alternative to the unicast form of communications described above. In contrast to unicast communications, multicast messages are directed to all the users and therefore are intended to propagate through the entire mesh network. In this multicast communications scheme, a MCDR may exchange data directly with another MCDR, or exchange data indirectly with another compatible equipped MCDR in the mesh network. The multicast communications enable users to communicate to all other users analogous to a walkie-talkie system with the exception that the preferred embodiment permits users to communicate even when separated by a distance greater than the maximum effective communication range of a given MCDR. The effective range of communications is achieved, in part, with MCDRs enabled to relay messages using what is referred to herein as Randomized Message Retransmission (RMR), which prevents broadcast-like flooding of messages as described in detail below. In the preferred embodiment, multicast communication using RMR is activated by the push of a single button on the handset, for example, which causes multicast transmissions to be generated as long as the button is depressed.

In this preferred embodiment, the voice or other data generated at a source MCDR device is transmitted and generally received by each node within the transmit range of the source device. Upon receipt of each packet of data, the recipients automatically relay or otherwise re-transmit the data. Each downstream node, in turn, also stochastically re-transmits the received data in accordance with a probability (discussed in more detail below) until the packet propagates through the entire network. To avoid a broadcast flood and loss of bandwidth that might occur if every node rebroadcast every packet received, the MCDRs employ the RMR scheme disclosed herein to restrict the number of nodes participating in the re-transmission process. In the preferred embodiment, whether or not a node re-transmits a packet is governed at least in part by a variable referred to herein as an expected value of a rebroadcast count, or simply "rebroadcast count," maintained by each MCDR. The rebroadcast count is preferably a real-number comprised of an integer portion greater than or equal to zero and a fractional portion less than one. The integer portion determines the minimum number of times a given packet must be rebroadcast while the fractional portion represents the probability that the given packet is rebroadcast one additional time. A rebroadcast count of 1.7, for example, indicates that the received packet is automatically re-transmitted once with a 70% chance of being transmitted a second time. A MCDR with a rebroadcast count of 0.6 has a 40% chance of not re-broadcasting the packet at all. In this manner, some and generally less than all nodes re-transmit messages, thereby avoiding a broadcast flood. To determine whether to transmit based on the fractional portion, the MCDR selects a random number between zero and one, and then re-transmits if the random number is less than the fractional portion. If and when a message is selected for re-transmission, the MCDR initiates the broadcast of the message at a start time randomly selected from a predetermined range in order to avoid packet collisions with other MCDRs re-transmitting the same message.

The rebroadcast count is a variable that is periodically updated to account for changes in the network topology, for example. In general, a rebroadcast count should be sufficiently high to ensure that each node receives each packet while being sufficiently low to minimize the number of redundant messages transmitted. The rebroadcast count of a particular node may be revised downward where the nodes are densely concentrated and therefore the probability of packets being dropped is low, or revised upward to compensate for a weak connection to an adjacent node resulting in dropped packets. In the preferred embodiment, a node is adapted to automatically reduce its rebroadcast count based at least partly on a rebroadcast decay rate prescribing the amount the rebroadcast count is decremented every predetermined interval. In addition, the rebroadcast count associated with a node is increased a determined amount on the occurrence of a qualified event, e.g., each time the node receives an indication that an adjacent node has not received a packet.

In this embodiment, nodes are adapted to detect and request a dropped packet using a sequential packet numbering scheme that chronologically orders the packets of a given message stream from a given node. A missing packet may then be readily detected from a gap in the sequence by comparing the sequence numbers of consecutive packets received. The missing packet may also be specifically requested using the missing sequence number. The message sent to confirm a lost packet and request its retransmission is referred to herein a negative acknowledgement message, also called a NACK, to acknowledge its non-receipt.

Figure 16:
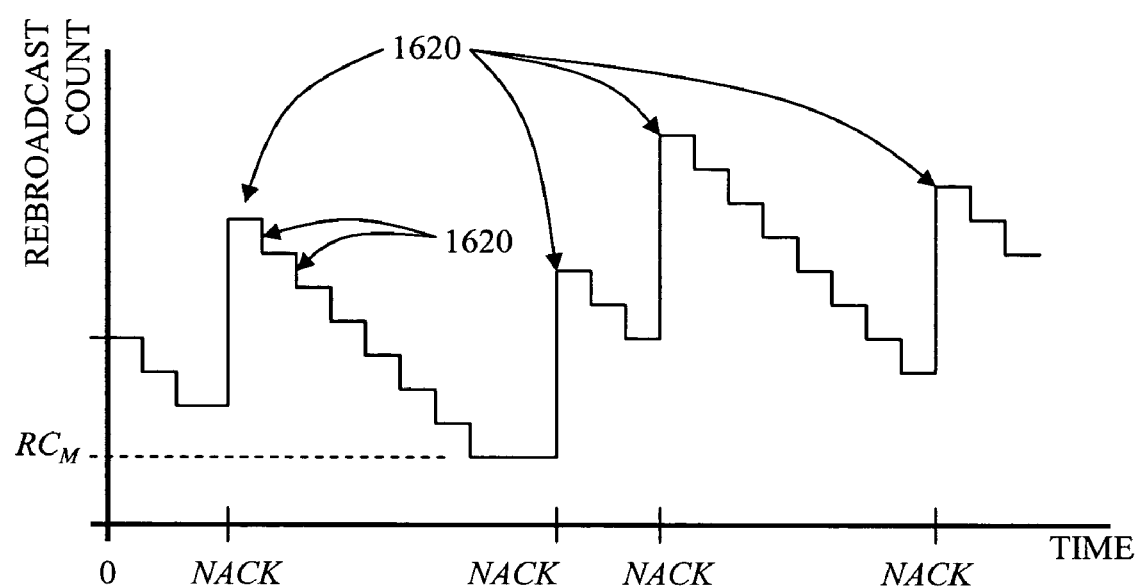
FIG. 16 illustrates rebroadcast count as a function of time.

As illustrated in FIG. 16, the rebroadcast count is initially assigned a default value greater than zero. Thereafter, the rebroadcast count is periodically decremented in accordance with the rebroadcast decay rate, as indicated by event 1610 until a predetermined minimum is reached or the count raised. The rebroadcast count is raised in accordance with a NACK increment value when a NACK is detected if the recipient node could respond to the NACK with the dropped packet. There are four NACKs received as indicated by events 1620 in this illustration. The rebroadcast count will vary over time and generally result in an average that reflects network topology and connectivity conditions.

As stated above, the rebroadcast count may be decremented until a minimum rebroadcast count, referred to as $RC_M$, is reached. The minimum rebroadcast count is set to a number greater than zero to ensure that each node rebroadcasts a minimal number of received packets, thereby preventing an MCDR from falling silent. This ensures each node can still establish contact with new nodes that may enter the network. A new node entering the network, for example, will eventually receive a first packet with a sequence number and transmit a NACK requesting the packets with the preceding sequence numbers. Thereafter, the one or more nodes that receive the NACK will increase their respective rebroadcast counts to increase the probability of the new node receiving each packet transmitted with the minimal number of rebroadcasts. In some embodiments, an arbitration scheme may be used to determine which node may resend the dropped packet, although retransmission of voice data or other real-time transmissions is generally unnecessary.

In this preferred embodiment, each of the nodes participating in the multicast communication is adapted to operate on the same channel, i.e., at the same frequency or two or more frequencies that hop in a predetermined order.

The scope of the wireless mesh network discussed herein may be extended using a combination of mobile nodes and stationary nodes detachably attached at a select geographic location. These stationary nodes, referred to herein as non-mobile node (NMN), are adapted to be deployed in those geographic areas with few or no MCDRs for purposes of operatively coupling MCDRs that cannot communicate directly. An NMN in the preferred embodiment is a wireless communication device with relay capability which—when strategically placed in locations with sparse network coverage—may increase MCDR connectivity and expand the scope of the network. The stationary devices may be coupled to an alternating current power source and/or be attached to a vertical surface such as wall, for example, or frictionally attached to a horizontal surface such as a table or ceiling, for example. In the preferred embodiment, however, an NMN is embodied in compact wall unit that plugs into and receives power from a wall outlet socket prevalent in residential and commercial buildings.

Referring to the perspective view of FIG. 17A and cross section of FIG. 17B, the NMN is a plug-through relay 1700 including a housing 1710, one or more female power receptacles 1720, one or more male plugs 1750, one or more status indicators 1730, and mounting hardware such as one or more screws 1740. Each of the power outlets 1720 is, for example, a 110 volt alternating current (AC) plug including a pair of recesses 1722 for receiving the conductors of a power cord and recess 1724 for a ground pin. As illustrated in the cross section of FIG. 17B, the relay 1700 further includes plugs 1750 with conductors and ground pin adapted to plug into a wall standard wall outlet. Each receptacle 1720 on the face of the relay 1700 is electrically coupled to the corresponding male plug 1750 with conductors 1752 and ground pin 1754 on the backside, thereby making electricity available to a user without disrupting the operation of the relay 1700. The relay 1700 may further include one or more screws, tamper-proof screws for example, adapted to couple the relay to the faceplate or mudring of an electrical box.

As illustrated in the functional block diagram of FIG. 17C, the relay 1700 in one embodiment includes a network controller and radio 1760 which, in combination with an antenna 1770, is adapted to receive and relay messages from MCDRs in accordance with the unicast communication protocol or multicast communication described above, or a combination thereof. In particular, the relay 1700 includes a transceiver and ad hoc network process consistent with the embodiment discussed in connection with FIG. 2, both of which are powered from the power outlet into which the relay is inserted. In some embodiments, the unicast communication protocol or multicast communication protocol are exchanged between nodes using the Carrier Sense Multiple Access with Collision Avoidance (CSMA/CA) protocol disclosed in the family of 802.11 protocols (802.11, 802.11a, 802.11b, 802.11g, 802.11n, and non-standard channel bonding) disclosed by the Institute of Electrical and Electronics Engineers (IEEE) local area network/metropolitan area network (LAN.MAN) Standards Committee, each protocol hereby incorporated herein.

The operational status and transmission status may be indicated using light emitting diodes, for example, visible from the front face of the relay. In some embodiments, the plug-through relay 1700 further includes an infrared controller 1780 with a receiver or transceiver (not shown) for downloading relay configuration information or resetting the relay, for example. As one skilled in the art will appreciate, the infrared controller 1780 may be used by a network administrator to install local configuration information when the radio frequency (RF)-based network is installed or temporarily inoperable. The set of configuration information preferably includes, but is not limited to: security controls including access codes, transmit range, transmit frequency, and classes of packets for which relay transmission is authorized or prohibited.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A handheld, mobile communication device adapted to operably couple to a plurality of mobile nodes in an ad hoc network, the device comprising:
    a link management module for establishing a wireless communication link with at least one of the plurality of mobile nodes; wherein the link management module is adapted to:
        receive at least one message from the plurality of nodes, each message associated with a plurality of periodic transmission slots;
        identify one or more of the transmission slots of a plurality of transmission slots that are available for transmitting to at least one node of the plurality of mobile nodes; and
        broadcast a slot reservation request to reserve one or more of the plurality of available transmission slots; and
    a call management module adapted to:
        transmit, during the one or more reserved slot, a first set of one or more units of voice data generated at the communication device; and
        relay, during the one or more reserved slot, a second set of one or more units of voice data received from one of the plurality of mobile nodes.

2. The mobile communication device of claim 1, wherein the plurality of transmission slots are time slots associated with a time division multiple access (TDMA) protocol and a plurality of frequency channels.

3. The mobile communication device of claim 2, wherein each of the plurality of transmission slots is associated with a temporal position in a frame that repeats at a periodic interval.

4. The mobile communication device of claim 3, further comprising a transceiver tuned to:
    a first channel of the plurality of frequency channels during a first set of the plurality of transmission slots of the frame; and
    a second channel of the plurality of frequency channels during a second set of the plurality of transmission slots of the frame.

5. The mobile communication device of claim 4, wherein the first channel changes to a different one of the plurality of frequency channels with each repetition of the frame.

6. The mobile communication device of claim 5, wherein the second channel is the same with each repetition of the frame.

7. The mobile communication device of claim 4, wherein the first channel is an overhead channel, and the second channel is a home channel.

8. The mobile communication device of claim 1, wherein the call management module is further adapted to discover a communication route comprising a plurality of nodes through the ad hoc network from the mobile communication device to a destination node.

9. The mobile communication device of claim 8, wherein the call management module is further adapted to:
    receive a call request discovery message broadcast from one or more neighbor nodes, wherein each discovery message comprises an identifier associated with a call originating from a source node, an identifier of a destination node with which the call is being requested, an identifier of a node from which the call request discovery message was received, and one or more route metrics;
    compare an identifier associated with the mobile communication device with the identifier of the destination node of each of the call request discovery message received in a predetermined period of time;
    if the identifier associated with the mobile communication device is different than the identifier of the destination node of each of the received call request discovery messages, then:
        generate, for each of the received call request discovery messages, a cost associated with each prospective path from the source node to the mobile communication device based on the one or more route metrics;
        record the identifier of the node from which the call request discovery message associated with the prospective path having the least cost was received;
        update the selected call request discovery message with the identifier of the mobile communication device and one or more updated route metrics; and
        broadcast the updated call request discovery message.

10. The mobile communication device of claim 9, wherein the call management module is adapted to, if an identifier associated with the mobile communication device is the same as the identifier of the destination node of one or more call request messages:
    generate, for each of the received call request discovery messages, a cost associated with each prospective path from the source node to the mobile communication device based on the one or more route metrics; and transmit, to the node associated with the prospective path having the least cost, a call request call setup message to establish a communication session communicated via the least cost path.

11. The mobile communication device of claim 9, wherein the one or more metrics comprises a hop count.

12. The mobile communication device of claim 1, wherein the call management module is further adapted to transmit a route repair message if a wireless communication link between a first intermediate node and a second intermediate fails during an ongoing call between a source node and a destination node; wherein the first intermediate node and second intermediate node of the plurality of nodes are used to relay voice data between the source node and the destination node.

13. The mobile communication device of claim 12, wherein the call management module is, if the mobile communication device is the first intermediate, further adapted to:
   broadcast a first route repair message comprising an identifier of an ongoing call, an identifier of the second intermediate node in a communication route between the first intermediate node and the destination node, an identifier associated with the mobile communication device, and a maximum hop count less than or equal to three.

14. The mobile communication device of claim 13, wherein the call management module is further adapted to broadcast a second route repair message to a third intermediate node between the second intermediate node and the destination node if the second intermediate node is unreachable.

15. The mobile communication device of claim 12, wherein the call management module is, if an identifier associated with the mobile communication device is different than the identifier of the second node, and if the cumulative hop count does not exceed a maximum hop count, further adapted to:
   receive a route repair message broadcast from one or more intermediate nodes configured to relay messages between the source node and the destination node, wherein each route repair message comprises an identifier of an ongoing call, an identifier of a node from which the route repair message was received, the identifier of the second node to which the route repair message is directed, and a cumulative hop count;
   generate, for each route repair message received, a cost associated with a prospective path from the first intermediate node to the mobile communication device based on the cumulative hop count;
   record the identifier of the node from which the route repair message associated with a prospective path having the least cost was received;
   update the route repair message with the identifier of the mobile communication device and an updated cumulative hop count; and
   broadcast the updated route repair message.

16. The mobile communication device of claim 12, wherein the call management module is, if the identifier associated with the mobile communication device is the same as the identifier of the second intermediate node, further adapted to:
   receive one or more route repair messages, wherein each route repair message comprises an identifier of an ongoing call, an identifier of a node from which the route repair message was received, the identifier of the second node to which the route repair message is directed, and a cumulative hop count;
   generate, for each of the one or more received route repair messages, a cost associated with a prospective path between the first intermediate node and the second intermediate node based on the cumulative hop count; and
   transmit a call setup message to the node from which the mobile communication device received the route repair message associated with the prospective path having the least cost to the first node;
   whereby communication between the source node and the destination node is restored using a communication route comprising the least cost path between the mobile communication device and the first node.

* * * * *